(12) United States Patent
Lidow

(10) Patent No.: US 6,889,197 B2
(45) Date of Patent: May 3, 2005

(54) SUPPLY CHAIN ARCHITECTURE

(75) Inventor: Derek Lidow, El Segundo, CA (US)

(73) Assignee: iSuppli Inc., Grand Cayman (KY)

( * ) Notice: Subject to any disclaimer, the term of this patent is extended or adjusted under 35 U.S.C. 154(b) by 8 days.

(21) Appl. No.: 09/758,509

(22) Filed: Jan. 11, 2001

(65) Prior Publication Data

US 2002/0019761 A1 Feb. 14, 2002

Related U.S. Application Data

(60) Provisional application No. 60/213,279, filed on Apr. 12, 2001, and provisional application No. 60/175,868, filed on Jan. 12, 2000.

(51) Int. Cl.⁷ .............................................. G06F 17/60
(52) U.S. Cl. ........................................................ 705/10
(58) Field of Search ............................ 705/1, 7, 10, 26, 705/28

(56) References Cited

U.S. PATENT DOCUMENTS

| | | | |
|---|---|---|---|
| 4,799,156 A | 1/1989 | Shavit et al. ................... | 705/26 |
| 4,827,423 A | 5/1989 | Beasley et al. ................ | 700/96 |
| 5,408,443 A | 4/1995 | Weinberger ..................... | 368/10 |
| 5,608,620 A | 3/1997 | Lundgren ....................... | 705/1 |
| 5,615,109 A | 3/1997 | Eder .............................. | 705/8 |
| 5,819,228 A | 10/1998 | Spiro .............................. | 705/2 |
| 5,893,076 A | 4/1999 | Hafner et al. .................. | 705/28 |
| 5,946,662 A | 8/1999 | Ettl et al. ........................ | 705/8 |
| 5,953,707 A | 9/1999 | Huang et al. ................... | 705/10 |
| 5,974,395 A | * 10/1999 | Bellini et al. ................... | 705/9 |
| 6,006,196 A | 12/1999 | Feigin et al. ................... | 705/10 |
| 6,151,582 A | 11/2000 | Huang et al. ................... | 705/8 |
| 6,167,378 A | 12/2000 | Webber, Jr. et al. ............ | 705/8 |
| 6,167,380 A | 12/2000 | Kennedy et al. ............... | 705/10 |
| 6,167,385 A | 12/2000 | Hartley-Urquhart .......... | 705/35 |
| 6,188,989 B1 | 2/2001 | Kennedy ........................ | 705/8 |
| 6,324,522 B2 | 11/2001 | Peterson et al. ............... | 705/28 |
| 6,341,266 B1 | 1/2002 | Braun ............................. | 705/7 |
| 6,477,660 B1 | 11/2002 | Sohner .......................... | 714/1 |
| 6,587,827 B1 | 7/2003 | Hennig et al. ................. | 705/1 |
| 6,591,243 B1 | 7/2003 | Grettve et al. ................. | 705/8 |
| 6,609,101 B1 | 8/2003 | Landvater ..................... | 705/10 |
| 2002/0032611 A1 | 3/2002 | Khan ............................ | 705/26 |
| 2002/0069121 A1 | 6/2002 | Jain et al. ...................... | 705/26 |

FOREIGN PATENT DOCUMENTS

EP    1361531 A2 * 11/2003 ........... G06F/17/60

OTHER PUBLICATIONS

Vollman, Thomas E., William L. Berry & D. Clay Whybark. Manufacturing Planning and Control Systems (4th ed). McGraw–Hill, pp. 312–353, 1997.*

Landvater, Darryl V. World Class Production and Inventory Management (2nd ed). John Wiley & Sons, Inc., pp. 69–95, 1997.*

* cited by examiner

Primary Examiner—Susanna M. Diaz
(74) Attorney, Agent, or Firm—Ostrolenk, Faber, Gerb & Soffen, LLP

(57) ABSTRACT

A supply chain network where customers, suppliers, logistics providers, carriers, and financial institutions are all connected to a centralized supply chain server. The server receives forecasts for direct material procurement from the customers detailing the orders that the customers desire. These forecasts are analyzed by the supply chain server to ensure that they conform to contractual agreements and do not contain errors. The supply chain server sends the forecasted demands to at least one supplier after determining the forecasts are valid. The supply chain server controls the processes involved in distributing the product from the suppliers to the customers including the generation and payment of invoices. A form of financing the customers' purchases, made possible by the novel supply chain architecture, is also disclosed.

60 Claims, 25 Drawing Sheets

| | – REAL-TIME – | – DAILY – | – WEEKLY – | – MONTHLY – |
|---|---|---|---|---|
| OPERATIONAL | ○ORDER STATUS<br>○(EVENTUALLY) CUSTOMER INFO UPDATES<br>○ABORT CODE<br>○EMAIL TO ACCOUNT TEAM<br>○SHIPMENT TRACKING (LINK TO 3PL SITE)<br>○ALERTS/ MESSAGES | ○CUSTOMER OPEN ORDERS<br>○CUSTOMER PARTS PURCHASED WEEK-TO-DATE<br>○$'S SPENT WEEK-TO-DATE<br>○ALLOCATION WATCH<br>○PART SPECIFIC QUANTITIES PURCHASED WEEK-TO-DATE<br>○COMMODITY-SPECIFIC QUANTITIES PURCHASED WEEK-TO-DATE<br>○TOP-OFF PARTS ATP* | ○CUSTOMER PARTS PURCHASED MONTH-TO-DATE<br>○CUSTOMER $'S SPENT MONTH-TO-DATE<br>○CUSTOMER ORDER QUANTITIES<br>○WHAT'S NEW<br>○MARKET INFO<br>○CUSTOMER FORECAST LOG<br>○ACCOUNT BALANCES<br>○PART SPECIFIC QUANTITIES PURCHASED MONTH-TO-DATE<br>○COMMODITY-SPECIFIC QUANTITIES PURCHASED MONTH-TO-DATE | ○CURRENT SERVICES (I.E. SERVICES CUSTOMER HAS SUBSCRIBED TO)<br>○CUSTOMER PARTS PURCHASED YEAR-TO-DATE<br>○HISTORICAL STATISTICS (ORDER LOG, FORECAST LOG, ISSUES RESOLVED PRIOR TO CURRENT MONTH<br>○CUSTOMER $'S SPENT WEEK-TO-DATE<br>○PARTS SUPPLIED BY SUPPLY CHAIN NETWORK<br>○BASIC DATA SERVICE REPORTS<br>○PARTS SPECIFIC QUANTITIES PURCHASED YEAR-TO-DATE<br>○COMMODITY-SPECIFIC QUANTITIES PURCHASED YEAR-TO-DATE<br>○FEED FORWARD REPORTS<br>○PREMIUM DATA SERVICE REPORTS*<br>○BULLSEYE REPORTS |
| ANALYSIS | | ○CUSTOM REPORTS* | ○CUSTOM REPORTS* | ○SUPPLIER PERFORMANCE STATISTICS<br>○SUPPLY CHAIN NETWORK PERFORMANCE STATISTICS<br>○SUPPLY CHAIN NETWORK FORECAST ACCURACY/UPTAKE %<br>○3PL PERFORMANCE STATISTICS<br>○MARKET DATA TRENDS*<br>○CUSTOM REPORTS ANALYSIS* |

FIG. 19

SUPPLY CHAIN ARCHITECTURE

CROSS-REFERENCE TO RELATED APPLICATIONS

This application claims priority to provisional application No. 60/175,868 filed Jan. 12, 2000 and provisional application No. 60/213,279 filed Apr. 12, 2001.

BACKGROUND OF THE INVENTION

1. Field of the Invention

The invention relates to an improved supply chain network and, more particularly, to a supply chain network which centralizes many operations thereby yielding a supply chain that is more efficient and less costly than prior art systems.

2. Description of the Related Art

Manufacturers (hereinafter generally referred to as "customers") and suppliers of products or services (hereinafter collectively referred to as "products") are continuously interested in reducing costs. Materials make up a large fraction of total costs as do supply chain management costs. A supply chain is any and all activities associated with defining, designing, producing, receiving, monitoring, storing and using the components and sub-components used in manufacturing a product. Manufacturers/customers often find themselves paying higher prices, being short of products in times of high demand, forecasting needs inaccurately, and creating slow moving inventories because these manufacturers do not have the expertise, resources or time to manage their supply chain properly.

Direct materials account for between 35% to 70% of a manufacturer's total costs and often constitute the largest expense category. Lowering material costs significantly improves profitability. For example, a company in the business of contract electronics manufacturing could improve overall profitability by 20% to 30% from only a 1% drop in direct material prices.

Supply chain costs also constitute a significant fraction of a manufacturer's total expenditures. For example, supply chain costs include: planning, purchasing, inbound freight, receiving, inventory management and carrying costs, supplier monitoring, measurement, management, and the payment of invoices. These costs can account for between 5% and 25% of corporate expenditures. That estimate applies to both the manufacture and supply of the manufacturer's components. For example a 20% reduction in supply chain costs would significantly improve, and in many cases could double, the profits of a given manufacturer.

A typical prior art supply chain is shown in FIG. 1. Customers generally have two methods for procuring components and sub-components using prior art supply chains. As shown in prior art supply chain 50, large original equipment manufacturers ("OEMs"), contract electronics manufacturers ("CEMs"—not shown) or customers 52 (of components) will typically buy directly from a component manufacturer or supplier 56. This technique is known in the industry as "buying direct". Large customer 52 places an order with supplier 56 each time a part is needed. Supplier 56 gives the products to a carrier 58 who, in turn, delivers the ordered products to large customer 52.

Small customers 54 typically make purchases through a third party distributor or agent 60. Distributor 60 purchases parts from supplier 56 who gives the products to a carrier 62 who brings the products to distributor 60. Distributor 60 then transfers the products to another carrier 64 who delivers the products to small customers 54. Other types of third party distributors use an electronic means to hold auctions for components. However, as the time involved in attending the electronic auction is lengthy, such services are rarely used except for one-time, or spot component requirements.

Many of the parties involved are not pleased with prior art supply chains. Known supply chain networks commonly yield missed shipments and discontinuity of component supply to a customer. These deficiencies particularly frustrate customers in times of "allocation" where there are shortages of key components. This causes delays in end product shipments and corresponding loss of revenues and profits.

Component suppliers 56 in particular are frustrated with prior art supply chains. Changes in market conditions for these entities' end products yield very volatile manufacturing schedules, resulting in inefficient factory usage and higher costs. Component suppliers 56 have also invested heavily in MRP (Materials Resource Planning) and ERP (Enterprise Resource Planning) systems to try to incrementally improve factory loading and inventory levels.

In these systems, component suppliers plan to provide parts based upon production plans generated by a customer factory or series of factories using the same system. However, these systems often produce disappointing results because they operate only within each individual component supplier and often only process production plans on a weekly basis. As such, these systems typically react slowly when compared with the rate of order fluctuations and are unable to detect excess inventories located in non-primary warehouses thereby resulting in excess parts being ordered.

To solve some of these problems, some larger manufacturing customers 52 require that suppliers 56 maintain dedicated on-site or local consignment inventories of the products these manufacturing customers 52 require. However, maintaining these additional inventory locations is very costly and difficult to control. The additional inventories also create further inefficiencies in the use or production capacity and total inventory.

Additionally, customers 54 are often serviced through distributors 60 who require 7% to 35% gross margin points to manage and cover inventory handling costs in addition to the supply chain costs already borne by these customers 54. These distributor margins reduce supplier's 56 profitability on small and medium sized customers 54 and produce a tension between suppliers 56 and distributors 60 on how or whether to limit distributor margins. Furthermore, distribution orders cost more to administer with special processes and systems required to manage "ship-and-debit" pricing and stock rotations. Finally, selling and servicing customers costs between 5% and 10% of sales—excluding marketing and advertising costs. Suppliers 56 have difficulty finding a pay-back for these investments.

There are payment problems in prior art supply chains as well. In many prior art systems, products are sold to customers 52, 54 with payment terms that are ignored. For example, the customers receive the products from suppliers 56 and then have 30 days from delivery to provide payment to suppliers 56. Customers frequently take advantage of this payment term and not pay until after the term has expired, for example, 45 days from delivery. Customers find this arrangement more desirable than taking a loan to cover the costs of the products and paying the loan on time. By delaying payment, the customers' balance sheets indicate a payable instead of a loan; a more attractive view for investors. It is generally not worthwhile for suppliers 56 to complain about a 15 day discrepancy but the suppliers 56 lose money during those 15 days. To solve this problem, suppliers 56 create a de facto interest for money expected to be lost due to late payment by charging customers more for parts. This de facto interest is clearly undesirable for customers 52, 54.

Moreover, toward the end of accounting periods, suppliers 56 are frequently desirous to ship products ahead of schedule to improve the appearance of respective balance sheets. Distributors 60 for the suppliers 56 are aware of this desire and consequently require suppliers 56 to offer discounts to receive goods before scheduled shipments. These extra discounts required by distributors 60 present yet another disadvantage of known supply chains networks.

Thus, there exists a need in the art for a supply chain architecture which can remove the inefficiencies referenced above and thereby reduce the losses incurred by both customers and suppliers in the sale and distribution of products.

SUMMARY OF THE INVENTION

A supply chain network where customers, suppliers, logistics providers, carriers, and financial institutions are all connected to a centralized supply chain server. The server receives forecasts from the customers detailing the orders that the customers desire. These forecasts are analyzed by the supply chain server to ensure that they conform to contractual agreements and do not contain errors. The forecasts are also used to warn the suppliers of future demands so that the suppliers can anticipate demands and plan inventory accordingly.

The supply chain server checks with the suppliers to determine whether the forecasts can be fulfilled by the suppliers. If the forecasts cannot be fulfilled by the suppliers, the supply chain server contacts customers and suppliers and attempts to either redistribute the customers' demands to different suppliers or request that customers alter their demands. When supply issues have been resolved, the customers' demands are sent to the suppliers in groups so that the suppliers need to prepare a smaller number of large orders.

The supply chain server oversees and controls the processes involved in distributing the product from the suppliers to the customers including the generation of purchase orders and invoices. Customers pay the supply chain server and that payment is then forwarded to the appropriate suppliers and logistics providers. If a customer wishes to return a product, the return process is also overseen and controlled by the supply chain server. As customers, suppliers, and logistics providers all communicate with the supply chain server, the novel architecture yields useful information not available in the prior art. This information includes, for example, customer demand propensities, supplier performance, etc.

Since the supply chain server receives customer forecasts, an operator of the supply chain server can more confidently receive suppliers' products ahead of a designated schedule—thereby allowing a supplier to ship early to improve the supplier's accounting books. Additionally, the operator of the supply chain server can more confidently provide a customer with financing arrangements associated with the demanded products. This arrangement is because if the customer does not pay for the products as contracted, the operator can withhold shipment of future products to the customer.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown.

FIG. 19 is a diagram illustrating types of information and corresponding time intervals provided by the supply chain network in accordance with the invention.

DETAILED DESCRIPTION OF THE PREFERRED EMBODIMENT

I. General Overview

In the following description, terms describing processes and hardware are used interchangeably as it should be clear that the functions described could be implemented using many different forms of hardware, software or even manually.

The invention creates a network which supports customers requesting the same or similar products. The customers using a supply chain network in accordance with the invention realize lower costs and increased flexibility even in changing supply demands. In one embodiment, the products received by customers are initially qualified by the customers first—in that the products can be extensively tested by a customer before the product is "qualified" or permitted in the customer's manufacturing process. Once the product is qualified, a defined set of interactions occur in a particular sequence and at designated times that permit the supply chain to be managed and well synchronized between customer and supplier. Such a well synchronized supply chain has minimal inventories and short reaction supply times.

Figure 1:
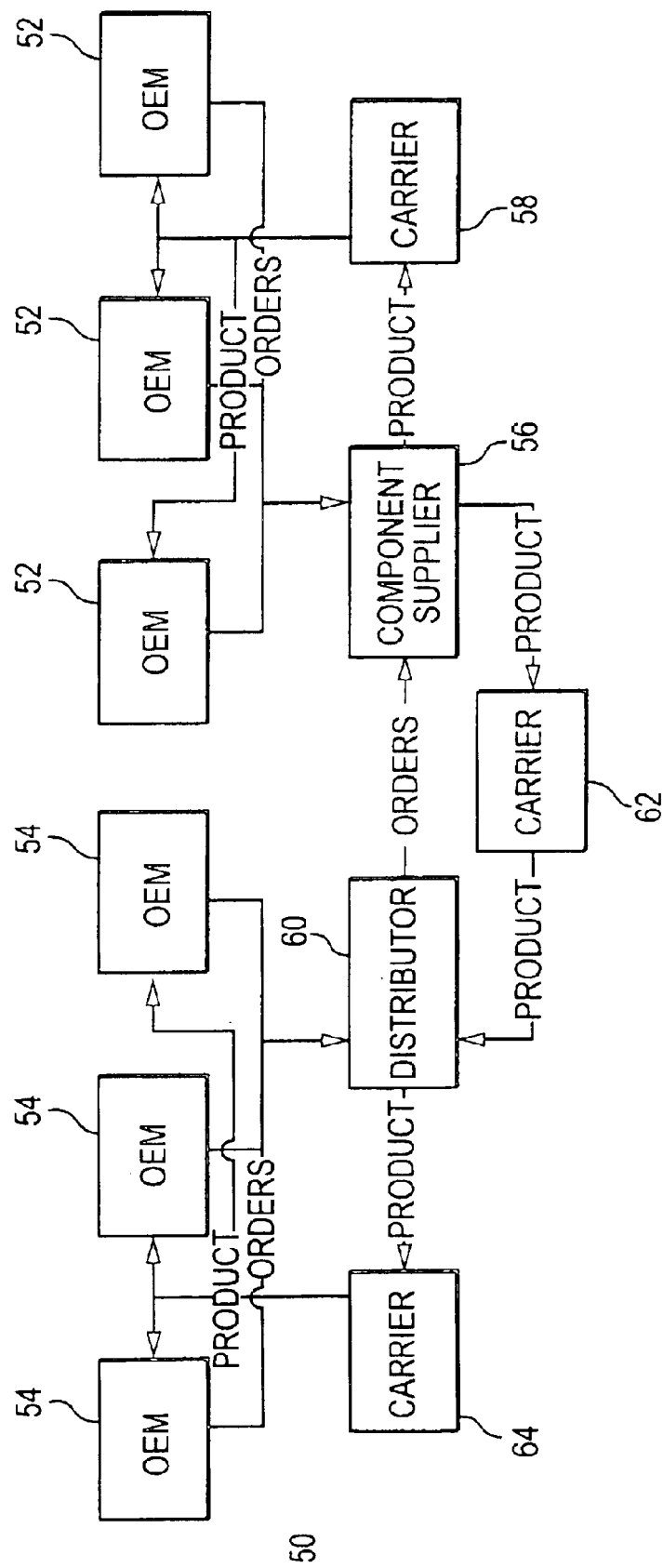
FIG. 1 is a block diagram of a prior art supply chain architecture.
Figure 2:
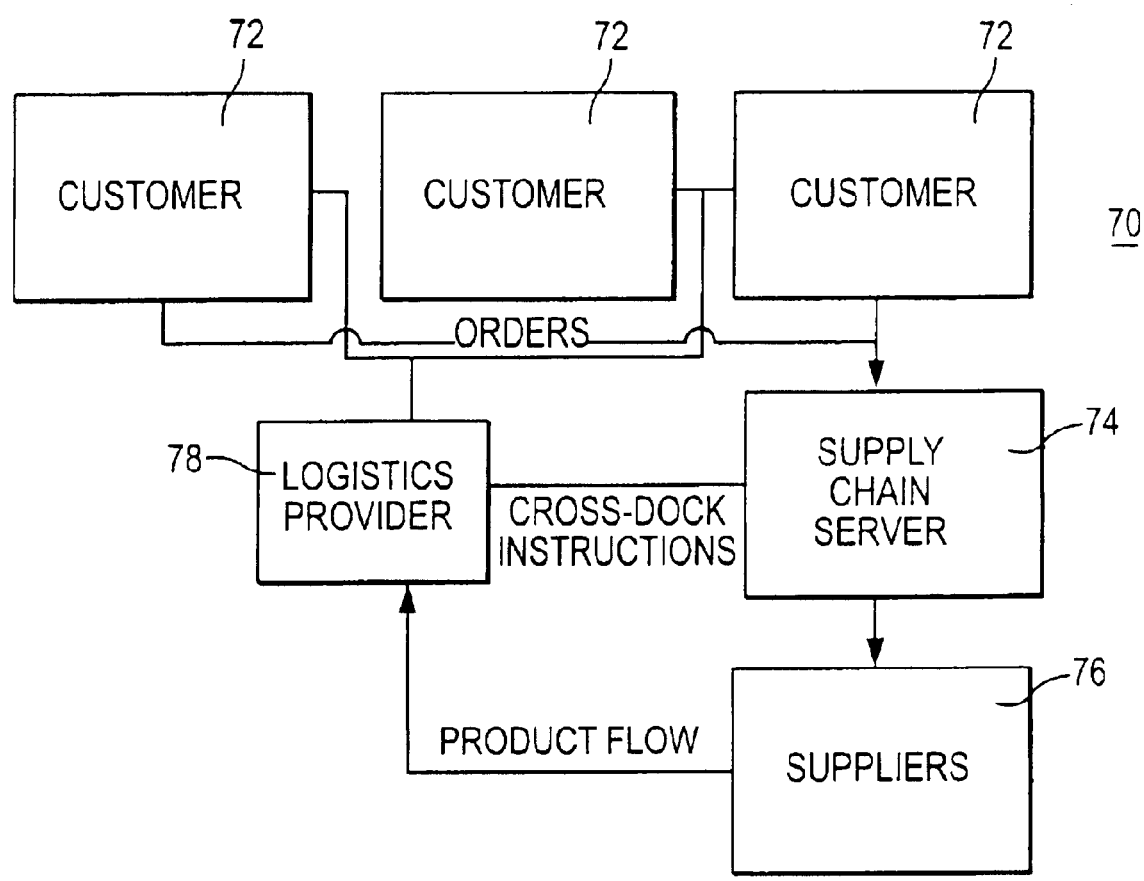
FIG. 2 is a block diagram of a supply chain network in accordance with the invention.

Referring to FIG. 2, there is shown a general overview of a supply chain network in accordance with the invention. Supply chain network 70 includes customers 72 of any size. Customers 72 each place orders with a supply chain server 74. Supply chain server 74 accumulates demand forecasts from customers 72 who are using the same or similar products. These demands are then aggregated and supply chain server 74 determines the best method for distributing all the products requested from any approved suppliers 76 to any requesting customers 72.

Although supply chain server 74 will typically be comprised of a computer, it will be referred to throughout the description as an entity capable of entering into a contractual relationship. It should be understood that in such descriptions, the operator of the server will be the real party in the contract. It should also be understood that supply chain server 74 need not be implemented as a computer.

Since the customer orders are aggregated by supply chain server 74, suppliers 76 need to assemble a relatively smaller number of orders compared with the number of customers and shipment for the entire network of customers. In one embodiment the products are then picked up by a freight company as designated by a logistics provider 78 (hereinafter "3PL"—third party logistic provider) and taken to a location (which can be the same location as where the shipment was picked up) where instructions are provided by supply chain server 74 for the distribution of the products. These instructions indicate how the order is to be broken down and re-assembled in the exact quantities required by the specific customers. Breaking down the order is called a cross-dock operation and is performed at a cross-dock point. Supply chain network 70 can work with any number of customers, suppliers and logistics providers. In another embodiment, the customer or the supplier point performs the activities ascribed to the Logistics Provider.

By deciding later in the distribution process to whom and where products will be shipped yields maximum flexibility, minimum overall cycle time, and eliminates the costly need to manage a customer's order within the supplier's order management system. This is advantageous because order management costs can be quite substantial for suppliers managing large numbers of customers and large numbers of different part types and numbers. The present invention provides economic advantages, as the cost of managing one order for one part is generally much higher than disassembling a larger order of many parts into specific quantities.

After the products are disassembled, the orders of each individual customer may be shipped to their final destinations using conventional means and carriers. For large quantities of products coming from many different suppliers and going to many different customer locations, the cross dock may be strategically located so as to minimize the overall shipping and handling costs.

Figure 3:
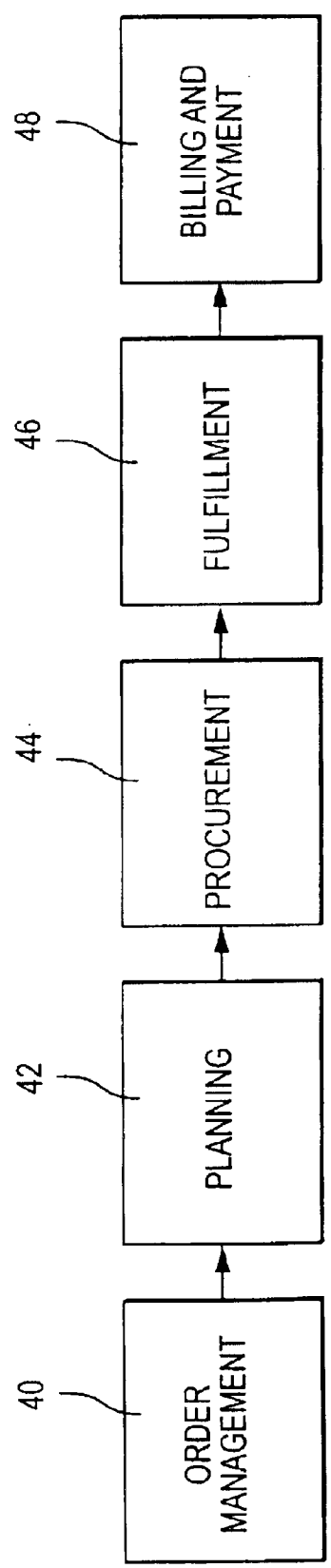
FIG. 3 is a block diagram illustrating the modules effectuating the supply chain network of FIG. 2.

Referring to FIG. 3, the operations of supply chain network 70 can be broken up into five main modules:

1) Order Management 40—collecting customer forecasts and determining if the requests are valid;

2) Planning 42—determining if customer demands exceed supply—and providing solutions if demand does exceed supply;

3) Procurement 44—execution of the purchasing process;

4) Fulfillment 46—transporting the products from suppliers to customers;

5) Billing and payment 48—generation and payment of invoices.

Although a typical customer demand will typically follow the order of the modules shown in FIG. 3, the Modules operate independently and sometimes concurrently as will be explained more fully below. For example, the Order Management for one day's demands may take place at the same time as the Fulfillment of a previous day's demands. Prior art supply chain systems handled many of these functions as completely independent events without communication between each functional module. For example, fulfillment was handled independently of supplier payments or even order management. In addition, information management refers to incorporated into each of these modules as would benefit its users. Information management refers to the accumulation of useful supply chain management information that is beneficial to customers and suppliers.

The invention manages all these activities for many customers and many suppliers simultaneously. This enables the invention to perform these tasks more efficiently for all parties. To illustrate this point, consider a customer X who receives a large rush order requiring certain parts from suppliers A and B but neither supplier A nor B have the inventories to meet the needs of the customer. By handling many customer and supplier supply and demand requirements simultaneously, a supply chain architecture in accordance with the invention can determine that a supplier C has extra parts of the same type demanded and that another customer Y plans to use either supplier B or C for his needs. The supply chain server can then arrange for supplier C to ship extra parts required by customer Y so that supplier B can ship extra parts required by customer X.

In one embodiment, supply chain network 70 is implemented using a cadence where all transactions are linked to one another and performed on a regular basis. For example, all customers using supply chain network 70 could order all parts within a certain commodity family on a given day of the week. This creates a large economy of scale in the fulfillment activities that is passed to users of the network. Frequently, production requirements are planned over the weekend thereby causing Monday to be a desirable day to start the Order Management cycle. As such, in one embodiment of the invention, Planning takes place on Monday night, Fulfillment of all parts on Tuesday, and Billing on Tuesday night. Some parts are used in very high volumes or are perishable. In accordance with the invention, these parts could be planned, ordered, and fulfilled on a daily cadence even marked off in hours. In prior art techniques, many dates needed to be entered, tracked and changed according to the expected delivery status of the product ordered. This is a very costly and time consuming task as the sequence of information, products, and currency can change depending upon the needs of the specific customers, suppliers and logistics providers that are using the network.

Product usage by customers is often determined by an of ERP computer system on a weekly basis, the supply chain network in accordance with the invention realizes order, planning, and delivery times that cumulatively considerably less than one week. This system enables customers to significantly vary production plans at the end of the work and still be able to receive the necessary parts without using a large quantity and assortment of parts in a costly inventory. This also eliminates the need to manage a multitude of dates in the ERP system.

The individual modules will now be explained in detail with continuing reference to FIG. 3. Note again that portions of these modules operate concurrently.

II. Order Management

The Order Management Module provides an environment where supply chain server 74 directly interacts with customers 72. This Module includes the processes required to capture customer demand and the validation and approval required to process that customer demand.

Customers 72 submit their demand for desired products to supply chain server 74 in multiple ways. For example, in a preferred embodiment, customers 72 submit their requests using a thirteen week forecast, week 0 daily callouts, and ad hoc requests. Each week, customers 72 submit a thirteen week forecast for each of the Planning/Ship-to locations specified in their contract with supply chain server 74. For high volume and volatile commodities such as DRAMs (dynamic random access memories), customers 72 also communicate their week 0 (i.e. current week) demand by sending daily callouts. In addition, customers 72 also have the ability to submit any unforecasted demand to supply chain server 74 by sending an ad hoc request. Such an ad hoc request is an order that no supplier has been prepared to receive as it was not forecasted or was not within forecasting tolerances defined in contractual arrangements between suppliers and customers or defined by contracts for the network. An ad hoc order is therefore more likely to be unfulfilled within a standard cadence without intervention from human Planners—discussed below.

Once customer demand is received, it is validated by the Order Management Module against contract terms and details outlined during an initial customer set-up process. This validation may include verifying that the forecast is complete, ensuring that every part number exists in the supply chain server system, and/or that all required information is complete and accurate. If a customer demand is invalid, abnormal, or incomplete, supply chain server 74 notifies the customer on a exception basis that something is wrong with their request and a resolution process is initiated. Examples of the analysis that the Order Management Module may perform and thereby improve the validity of the forecasts received include, but are not limited to:

identifying major shifts relative to previous weeks' forecasts;

identifying major cumulative shifts in buying patterns; and identifying requests outside agreed upon capacities.

Supply chain server 74 or Planners can also check supply and demand requirements relative to known customer events such as start-up, end-of-run, and plant shutdowns. Planners are employees of the operator supply chain server 74 who intervene when supply chain server 74 is unable to fulfill all the unconstrained demand with available supply as is described below. Planners contact customers, using for example, e-mail, and suppliers and suggest adjustments to their respective production plans to create a better supply and demand balance for all parties. Server 74 notifies Planners of these conditions using exception reporting. Planners can use a Planner Supply Tool (discussed below) which provides valuable and unique information produced by supply chain server 74. Planners can thus make better suggestions on how supply and demand can be balanced than that which could be performed by a customer or supplier on their own.

In response to an invalid demand, supply chain server 74 sends e-mail or other message alerts to all potentially impacted parties, including the employees of the supply chain server (i.e. Planners). Such message alerts can include, but are not limited to, issuing "Red light" or "Yellow light" alerts to depict relative importance and immediacy of attention required. Examples of such alerts are shown below. Clearly other criteria could be used to produce an alert message.

Nomenclature $N^a_b$=Forecast made on week 'a' for quantity to be delivered on week 'b' where $b \geq a$ $K_c$=Capacity available on week c Weeks 0–13 Abnormalities: Yellow lights For all: a, a-1, a-2, . . . , a-13

$0.8 < \Sigma\ N^a_b / \Sigma\ N^{a-1}_{b-1} < 1.2$, summed for $0 \leq b-a \leq 13$ (no more than 20% change in total requirements from week to week) and $0.75 < \Sigma\ N^a_b / \max(\Sigma\ N^a_b)$, summed for $0 \leq b-a \leq 13$ (no more than 25% upside volatility over the past 13 weeks)

$\Sigma\ N^{a+1}_{b+1} / \min(\Sigma\ N^a_b) < 1.25$, summed for $0 \leq b-a \leq 13$ (no more than 25% downside volatility over the past 13 weeks)

Weeks 9–13 Abnormalities: Yellow lights

For b=a+9, 10A, 11, 12, 13

$0.8 < N^a_b / N^{a-1}_{b-1} < 1.2$ (no more than 20% change in requirements from week to week)

Weeks 7, 8, 9 Abnormalities: Yellow lights

For b=a+7, 8, 9

$0.8 < N^a_b / N^{a-1}_{b-1} < 1.2$ (no more than 20% change in requirements from week to week)

Red Light $N^a_b > K_b$ (no week's requirement exceed capacity)

Weeks 0–6 Abnormalities: Yellow lights $0.8 < \Sigma\ N^a_b \Sigma\ N^{a-1}_{b-1} > 1.2$, summed for $0 \leq b-a \leq 6$ (no more than 20% change in total requirements from week to week) and For b=a+0, 1, 2, . . . , 6

$0.9 < N^a_b / N^{a-1}_{b-1} < 1.1$ (no more than 10% change in requirements from week to week)

Red lights
$N^a_b \leq K_b$
(no week's requirement exceed capacity) or
$0.7 \leq \Sigma\ N^a_b \Sigma\ N^{a-6}_b < 1.05$, summed for $0 \leq b-a \leq 6$
(no more than 30% unused requirement compared to what was started in production 6 weeks ago, and no more than 5% over)
Weeks 0, 1, 2 Abnormalities: Red lights
For b=a+0, 1, 2
$0.95 < N^a_b/N^{a-1}_{b-1} < 1.05$
(no more than 5% change in requirements from week to week)

Customer credit history and approval may also be integrated as part of the Order Management Module. After demand has been validated and the credit of the customer has been checked, the demand is sent to the Planning Module. Demand for customers on credit hold can be sent to a suspend file for action by an Account Manager.

Figure 4:
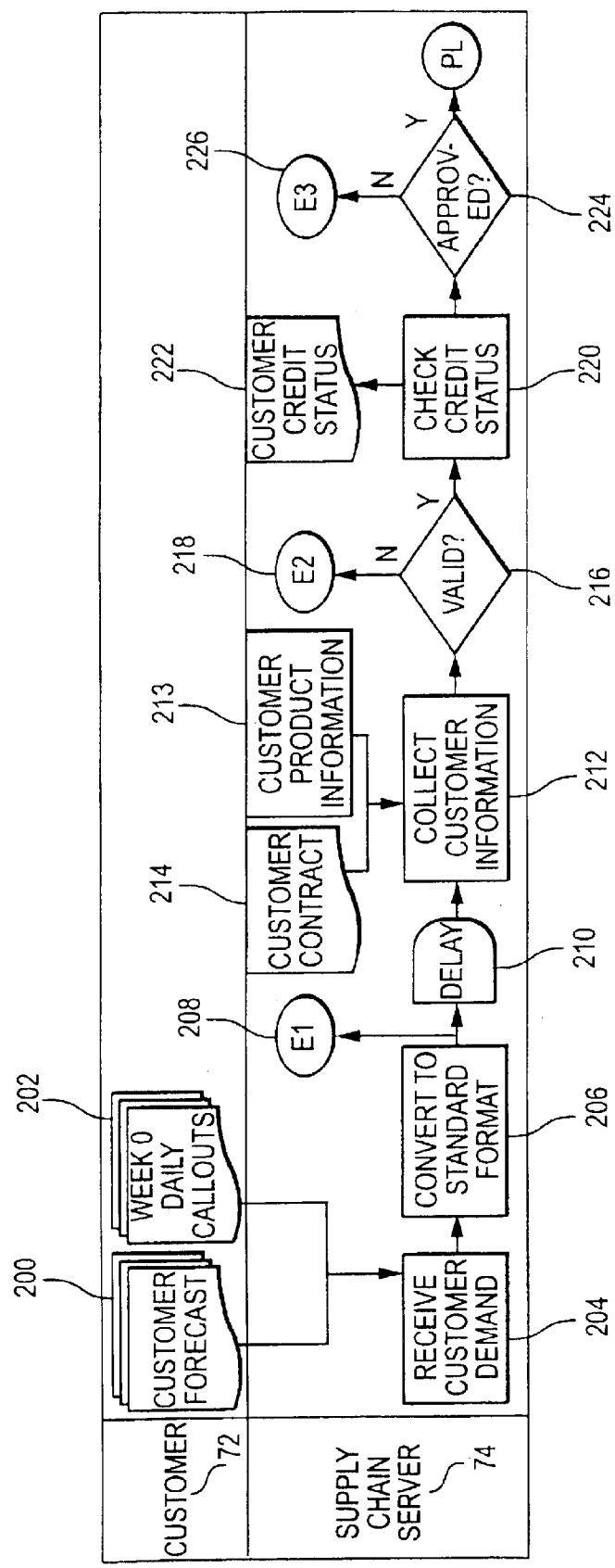
FIG. 4 is a diagram illustrating a Demand Capture and Validation process performed by an Order Management Module during a regular demand request in accordance with the invention.

An exemplary embodiment of the Order Management module will now be explained. Referring to FIG. 4, there is shown a demand capture and validation process performed by the Order Management module during a regular demand schedule. During a regular demand schedule, supply chain server 74 receives 204 a thirteen week customer forecast 200 and week 0 daily callouts 202 from customers 72. The forecasts may be from a plurality of customers or even from a plurality of sources within a single customer. Receiving circuit 204 may capture customer demands through, for example, an EDI (Electronic Data Interchange) forecast, an e-mail (e.g. with an EXCEL spreadsheet), an EDI purchase order ("PO") or through XML (extensive markup language) communication. Receiving circuit 204 may also capture specific services which may not be specified in the customer contract. For example, expedited delivery, special labeling, packaging, etc., all may be captured.

Supply chain server 74 converts 206 the customer demands 200, 202 into a standard format used by supply chain server 74 to analyze the customer demands. If there are problems with conversion 206, an error routine 208 is performed to cure all technical difficulties. In a preferred embodiment, all such technical difficulties should be resolved by the end of the business day. Thereafter, a delay circuit 210 ensures all the converted demands are stored and the required functional validations are performed by the end of the business day. Such a delay allows server 74 to accumulate demands (200, 202) for all customers.

A collect customer information circuit 212 compares the converted customer's demands with the corresponding customer contract 214 and with current customer product information 213 regarding the customer's products. Information 213 includes, for example, approved suppliers, specification revisions levels, etc.

A validation circuit 216 determines whether the converted demands are valid. Validation circuit 216 detects, for example, whether the demanding customer is actually a customer of supply chain network 70. Validation circuit 216 also detects whether customer forecast 200 is complete in that there is one forecast for every planning/ship-to location and part number combination, and that every part number has a specified quantity. Finally, validation circuit 216 may verify that the requested part number relates to a valid part contracted between customer 72 and the entity running supply chain server 74.

If validation circuit 216 determines that a particular customer demand is not valid, an error routine 218 is performed where a notification is sent to an Account Manager to resolve the outstanding issues. The Account manager is used to maintain a current standing for all customers by evaluating their payment history. Supply chain server 74 then sends the customer 72 an exception notification to inform the customer that the demand was incomplete in some way. The exception notification itself is stored in a suspend file until it is acted upon. If the customer demand is valid, supply chain server 74 checks 220 the credit status of the customer by referring to the customer's credit history 222. If the customer's credit standing is approved at 224, supply chain server 74 branches to the Planning Module (shown in FIG. 8). If the credit standing is not approved at 224, an error routine 226 is initiated where the Planner, the Account Manager and the Credit Manager attempt to form a resolution of the problem. Late payments or delinquent accounts are monitored by the Credit Manager. All customer demands with denied credit are stored in a credit suspend file. If a customer demand is denied because of bad credit, a notification is sent to the Account Manager, the Credit Manager, and the Planner informing them of the customer's intent to buy. In such a situation, the Planner can view the customer's demand but is not obligated to actually implement the planning until the credit issue is resolved.

Figure 5:
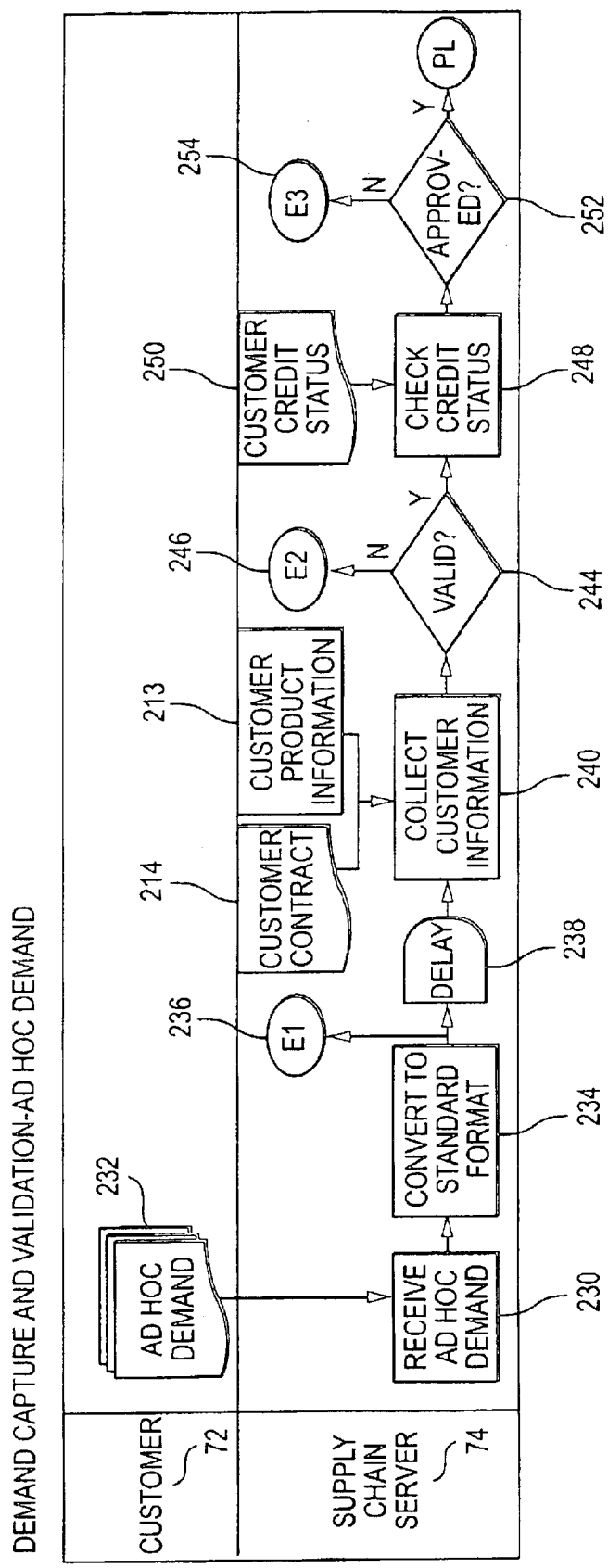
FIG. 5 is a diagram illustrating a Demand Capture and Validation process performed by the Order Management Module during an ad hoc demand request.

For an ad hoc demand, the process flow of the Order Management Module is as shown in FIG. 5. Referring to FIG. 5, as with a regular customer forecast of FIG. 4, supply chain server 74 receives 230 an ad hoc demand 232 and converts 234 ad hoc demand 232 into a standard format as explained above. Again ad hoc demand 232 can be captured via e-mail with, for example, an EXCEL spreadsheet or an EDI PO. Additional services, which were not specified in the customer contract, are also captured—such as expedited delivery, special labeling or packaging. Unlike with a regular customer forecast, a field is established (not shown) to identify the ad hoc demand to track order billing information. This field may optionally be used to generate an additional charge for ad hoc orders. If there are problems in converting the customer demand to a standard format, an error routine 236 is performed to cure all technical difficulties. In a preferred embodiment, all such technical difficulties should be resolved by the end of the business day.

Thereafter, a delay circuit 238 ensures all the converted demands are stored and the required functional validations are performed by the end of the business day. A collect customer information circuit 240 performs the validation by compiling the converted customer's demands and comparing them with customer contract 214 and customer product information 213.

A validation circuit 244 determines whether the converted demands are valid. Validation circuit 244 detects, for example, whether the demanding customer is actually a customer of supply chain server 70. Validation circuit 244 also detects whether the requested part number is a valid part contracted for between customer 72 and supply chain server 74. Unlike with a normal forecasted demand, no validation is necessary to determine if ad hoc demand 232 is complete as it is an unforecasted demand and can include either one or more customer part numbers.

If validation circuit 244 determines that the customer demand is not valid, an error routine 246 is performed where a notification is sent to the Account Manager to resolve the outstanding issues. Supply chain server 74 then sends customer 72 an exception notification to inform the customer that the demand was incomplete in some way. The exception notification itself is stored in a suspend file. If the customer demand is valid, supply chain server 74 checks 248 the credit status of the customer by referring to the customer's credit history 250. If the customer's credit standing is approved at 252, supply chain server 74 branches to the Planning Module. If the credit standing is not approved at 252, an error routine 254 is initiated where the Planner, the Account Manager and the Credit Manager attempt to form a resolution of the problem. All customer demands with denied credit are stored in a credit suspend file. If a customer demand is denied because of bad credit, a notification is sent to the Account Manager, the Credit Manager, and the Planner informing them of the customer's intent to buy.

In this way, the Order Management Module of supply chain server 74 uses a forecast system to replace the purchase order system that was used in the prior art. In prior art supply systems, suppliers did not see forecasts and could not determine whether a forecast was contrary to a contractual agreement or whether there was an undesired error in the forecast. The supplier only saw what a particular customer gave the supplier. Even if the supplier used an MRP system, MRP demands frequently vary significantly and suppliers did not have the ability to review these demands to ascertain unusual or unexpected requests. Suppliers thus often used replenishment algorithms to replenish their stock as they were never certain as to the expected amount of depletion of the stock.

The invention overcomes these problems by reviewing the customer forecasts for consistency with contractual agreements and with prior forecasts. The invention thereby produces continued delivery and performance thus reducing the amount of undesired scrap material produced when suppliers have excess inventory. Suppliers benefit from the supply chain architecture because demand volatility is minimized. This is due to the accumulation of the demand forecasts and filtration systems reviewing the demands. Suppliers can also replenish their inventories with more certainty as they are now given a forecast of customer demands from many customers a few weeks in advance. In high volatility demand industries such as demands for electronic components, prior art supply chains could not work based upon customer forecasts because a 50% change in demand from one week to the next was possible. As prior art supply chains took too long to deliver a product to a customer, they could not keep up with these highly volatile demands. However, the supply chain architecture of the invention enables much quicker delivery (e.g. within one week) so that forecasted based customer demands are possible.

The Order Management Module also provides customers with the ability to check the status of an order. A typical customer may be interested in knowing exactly what product he is getting and when that product is on its way. Listed below are some typical events that may be tracked by supply chain server 74. In each of these notifications, information may be sent to supply chain server 74 so that an extranet of supply chain server 74 (the hardware of supply chain server 74 is discussed more completely below) can be updated accordingly.

Order Release Notification

An order release notification provided by the Planning Module may be generated after a specific order is released to the supplier 76 or suppliers (one customer order may be fulfilled by several suppliers). This event may be used to inform customer 72 that their order has been reviewed and passed on to the suppliers who are responsible for fulfilling the order. The Planning Module then updates the Extranet at the time of forecast release to the Suppliers.

Shipment Pick Up Notification

A shipment pick up notification may be sent to supply chain server 74 by 3PL 78, indicating that a carrier has picked up a product from a given set of suppliers 76. This event provides supply chain server 74 with information used to monitor supplier 76 and 3PL 78 performance. This event also captures information that can be compared against the supply plan to identify discrepancies between expected and actual supplier shipments.

Cross-Dock Arrival Notification

A cross-dock arrival notification may be sent to supply chain server 74 by 3PL 78, indicating that a product has arrived at the cross-dock. This event also provides supply chain server 74 with information to continuously 3PL performance.

Shipment Notification

A shipment notification may be sent to supply chain server 74 by 3PL 78, indicating that the order is on its way to customer 72.

Customs-In Notification

When applicable, a customs-in notification may be sent to supply chain server 74 by 3PL 78, indicating that a product is in customs.

Customs-Out Notification

When applicable, a customs-out notification can be sent to supply chain server 74 by 3PL 78, indicating that a product is out of customs.

Proof of Delivery (POD) notification

A POD and final notification can be sent to supply chain server 74 by 3PL 78, indicating that a customer shipment has been delivered to the specified locations.

Flow Monitoring

Server 74 can monitor the flow of products through a bottleneck or pinch point in the supply chain. For example, it may be difficult to book a flight to a particular destination or to make it through customs at a particular city. A notification may be sent any time parts are bumped from a flight or when the parts make a crowded flight. A notification can be sent to a supplier's production line as well.

III. Planning

The supply chain network Planning Module is responsible for matching a source of suppliers 76 to meet customer demand and for initiating the Fulfillment Module. This capability also serves as a vehicle to capture vital, real-time data on: industry trends, commodity/product trends, customer forecast accuracy, and supplier performance. This data constitutes the basis for many of the daily management reports and additional expert services that supply chain network 70 offers to its suppliers 76 and customers 72.

The long term planning function of the supply chain network 70 may be performed manually since it does not need to be performed on short notice or with high frequency. Short term planning, within manufacturing and materials procurement lead times, however, should be automated as it is performed very frequently. The results of the short term planning should then be executable within a matter of hours or minutes, with great accuracy. Otherwise, the plans may no longer apply to the fast paced change characteristic of many markets today.

The Planning Module may be triggered by any of a multiple number of events. An exemplary embodiment of these events includes the receipt of a customer's planning period (e.g., quarterly or thirteen week) forecast, the receipt of a daily forecast for a week 0 demand, the receipt of an ad hoc order (unforecasted demand) from a customer, a supplier's de-commit at the time of shipment (short shipment), or the delayed replacement of returned parts. All of these possibilities will be discussed below. In all of these circumstances, the process depends on multiple inputs such as: demand information from the customer, customer preferences for suppliers (if any), current capacity information from the supplier, tables cross-referencing customer parts to other similar parts used within supply chain network 70, and tables cross-referencing part numbers used in supply chain network 70 to supplier part numbers. An example of such tables can be found in co-pending application Ser. No. 09/704,643 filed on Nov. 2, 2000 for a SYSTEM AND METHOD FOR GENERATING A CROSS REFERENCE GUIDE, the entirety of which is hereby incorporated by reference.

As discussed above, in a preferred embodiment, each week, customers 72 submit a thirteen week demand forecast for each of the parts customers 72 will need over that time period. In the Planning Module, supply chain server 74 manages these forecasts and the demands are consolidated, translated into supplier part numbers, and transformed into specific supplier requirements. Supply chain server 74 achieves this transformation via demand aggregation, rough cut capacity matching and supply plan optimization. Server 74 may also extrapolate forecasts based on expected demand and historical data from customers 72.

Supply chain server 74 performs aggregation by accumulating demand for products made using the same or similar supplier manufacturing processes. Since customers, and often suppliers, like to assign different part numbers to the same or similar products, aggregation by trying to match identical part numbers is generally ineffective. However, as suppliers aggregate customer orders into MPUs, or Master Planning Units (sometimes also referred to as Master Planning Families), to schedule their internal production facilities, supply chain server 74 uses these same supplier defined MPUs to perform its aggregation.

Supply chain server 74 performs rough cut capacity matching, by first assigning aggregated demand to particular suppliers that customers 72 have determined as their preferred suppliers. Each customer 72 will have its own definition of a preferred supplier and supply chain server 74 retains this information in its data banks for each customer part number. Supply chain server 74 tests to see if this default assignment of demand to each preferred supplier falls within the supply capacity constraints given by suppliers 76. Any demand on a given supplier in excess of the supplier's capacity constraints is reassigned by supply chain server 74 to another supplier, based on customer second-choice preferences or other algorithms the network uses. Supply chain server 74 uses this iterative approach to determine a rough cut allocation of demand to the available supply.

Supply chain Planners may be used to review the rough cut capacity match to determine if any intervention is required to perform supply chain optimization. Since supply and demand of many types of components are very volatile and change on very short notice, Planners may wish to intervene to make manual adjustments to the rough cut capacity match. As an example of such an intervention, often suppliers of leading edge components suffer from periodic yield problems where they cannot produce their stated capacity for some period of time. In such an instance, supply chain server 74 will be informed by a supplier, through an electronic message, telephone call, or an ASN (advanced ship notice), that fewer parts than expected had actually been shipped. Supply chain Planners then, using extensive information available to them on the Supply chain network 70, decide how best to re-allocate demand products, either by manually overriding the system, or by entering new parameters into the system. This results in some demand reduction at the impacted supplier and increased demand at other suppliers. Thus, supply chain network 70 can be controlled so the Planner can feel more secure that all the supply chain network's customers will receive their parts as expected. Similarly, it sometimes may be in the customer's best interest to allocate some demand to a non-preferred supplier in order to foster a more competitive market-place, and the supply chain Planners may shift some demand to optimize supply chain network 70 in this way.

The result of supply chain optimization is a supply plan that effectively meets all customer demand within the suppliers' capacity constraints. The demand/supply matching process may be executed on a daily basis during week 0 for certain volatile commodities (i.e., DRAM). After confirming their ability to support this plan, suppliers are ready to execute the week 0 demand and initiate the fulfillment process in the Fulfillment Module. Suppliers may also be required to follow defined production or inventory management protocols relating to demanded products.

On occasion, a customer may place an ad hoc order with supply chain server 74 for quantities or material not originally included in the customer's weekly forecast. In such an event, capacity availability to support the new demand is investigated by Planners. The Planner identifies, when possible, source(s) for the new request and initiates the fulfillment process in the Fulfillment Module.

If a supplier 76 is unable to meet its commitment (short shipment), the Planner may act as an intermediary between the customer and supplier to resolve the situation. If necessary, the Planner will identify alternate sources of supply and restart the Fulfillment Module. If material is returned to the supplier and replacement parts are needed at a later date, the Planner adjusts future demand to reflect the need for the replacement parts.

The transactional nature of these processes provides supply chain network 74 with information critical to some of the value added services it may offer. This information includes: customer/industry buying patterns, customer forecast accuracy, supplier performance, and product transitions. Such information may be made available as is discussed in the Information Management section below.

Figure 6:
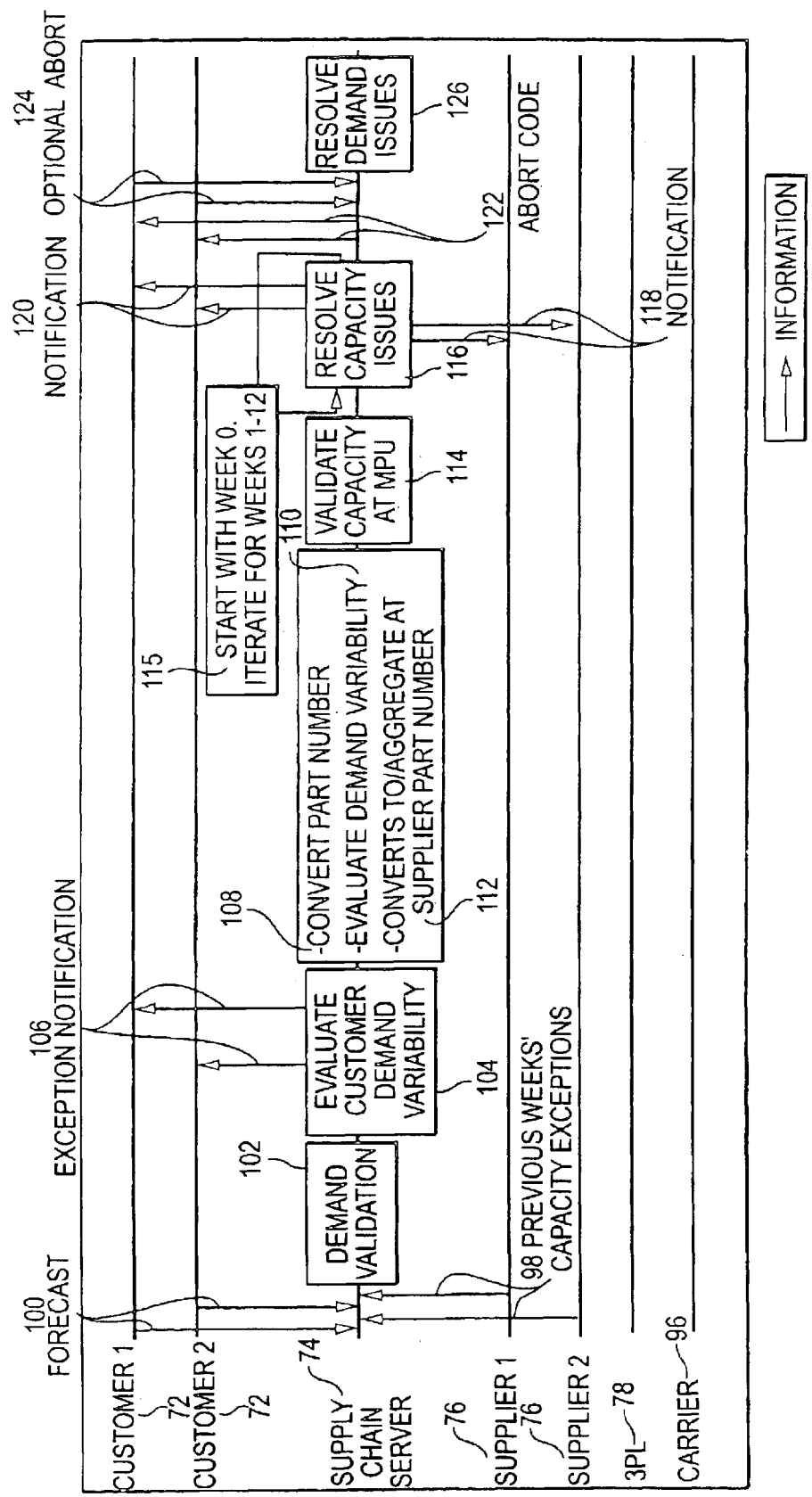
FIG. 6 is a diagram illustrating the processes performed by the Planning Module in accordance with the invention.

Referring to FIG. 6, there is shown the flow of information during operation of the Planning Module. A plurality of customers 72 (two are shown in the figure), a plurality of suppliers 76 (two are also shown), a 3PL 78 and a carrier 96 are connected to supply chain server 74. The Planning Module begins with suppliers 76 sending previous weeks' capacity exceptions 98 regarding supply shortfalls and customers 72 sending forecasts 100 to supply chain server 74. Forecasts 100 are adjusted to take into account previous weeks' returns which were not immediately replaced and not yet reflected in the forecast. (See the discussion in the Procurement Module below). Supply chain server 74 receives these inputs 98, 100 and performs a validation 102 of the demands made by customers 72 in forecasts 100.

As discussed above in the description of the Order Management Module, supply chain server 74 performs an evaluation 104 of the variability of forecasts 100 and issues exception notifications 106 when the variability of the forecasts do not conform to defined parameters. The part numbers requested by customers 72 are converted 108 to corresponding supply chain network part numbers. Supply chain server 74 evaluates 110 the demand variability of supply chain network part numbers. As with customer evaluation 104, supply chain server 74 determines the overall demand variability. This calculation is useful in that, even though each individual customer may avoid exceeding allowed tolerances, the aggregation of all customer requests may exceed total supply especially if many customers order close to their allowed limits. Such ordering may cause overall depletion of suppliers' products which may take some time to restore. The supply chain network part numbers are then converted 112 to corresponding supplier part numbers.

The capacity of suppliers 76 is validated 114 to determine if there are any capacity issues involved with the forecasts 100 of customers 72. As is indicated at 115, this process starts with the current week 0 demand and iterates through the week 12 demand. Any capacity issues are resolved 116 by sending a notification 118 to suppliers 76 and a notification 120 to customers 72. Customers 72 also receive an abort code 122 which enables customers 72 to send an optional abort 124 of part or all of forecast 100. Supply chain server 74 then resolves all demand issues 126 with suppliers 76 and control branches to Procurement Module 44 of FIG. 10A. Such an abort would then be displayed if the customer accesses its account through supply chain server 74 so that the customer knows that the order for the particular parts was aborted. These processes will now be explained in detail by way of an example.

Figure 7:
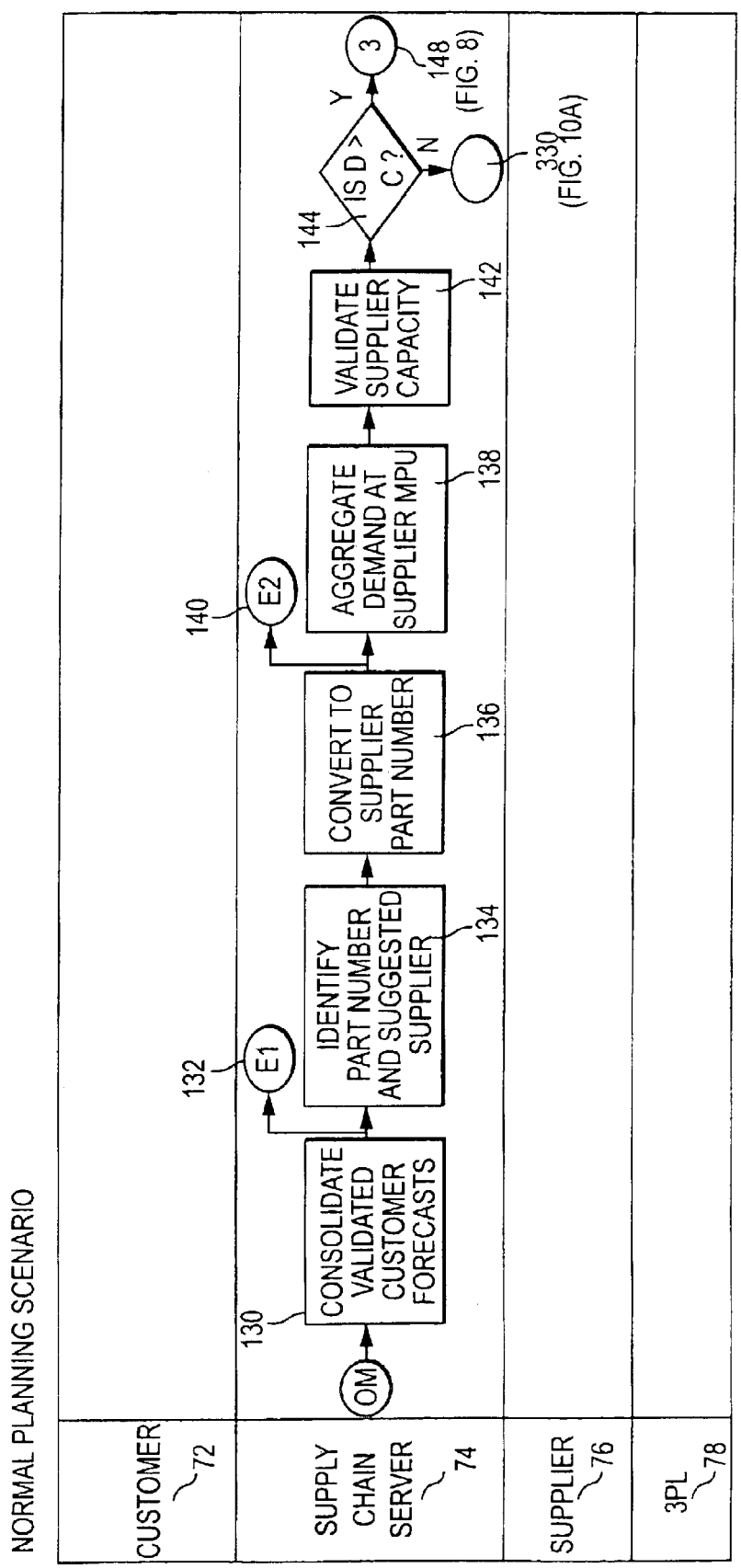
FIG. 7 is a diagram illustrating an example of the flow of information during the Planning Module of FIG. 6.

Referring now to FIG. 7, there is shown the processes performed by supply chain server 74 during a normal planning scenario. In the Planning Module, supply chain server 74 receives information from the Order Management Module (discussed above) regarding customer forecasts. Supply chain server 74 then consolidates 130 all validated customer requests. This consolidation includes grouping all customer forecasts into one large demand file (not shown) based on customer part and number. The validation itself was described in the Order Management module. Briefly, the validation includes determining whether the customer demand is invalid under contract terms, incomplete, or abnormal. If there are problems with the validation, an error process 132 is performed. Error process 132 is also explained more fully above. In brief, supply chain server 74 communicates with the customer having the validation problem to understand and resolve demand changes. This may include adjusting the demand quantities for a specific part number. Any changes are then reflected in an adjusted forecast.

The consolidated demand file is then analyzed 134 to identify corresponding supply chain network part numbers and suggested suppliers to provide the parts corresponding to the supply chain network part numbers. The supplier identification is based upon contracts negotiated with the customer as discussed above. In analyzation 134, a unique identifier is assigned to represent the demand for each part from each customer during each week. These identifiers are used to create an audit trail for each demand. Analyzation 134 also evaluates forecasts 100 from the previous week's demand to determine exception conditions—as was discussed more fully above in the description of the Order Management Module.

Supply chain server 74 then converts 136 the supply chain network part number of the consolidated demand file into corresponding supplier part numbers. This conversion can be done using the customer part number as well. The consolidated demand file is then aggregated 138 to produce supplier MPUs based upon contractual factors between supply chain server 74 and suppliers 76. The consolidated demand file is then validated 142 based upon the capacity of suppliers 76 and contractual provisions between supply chain network 74 and suppliers 76. These contractual provisions relate to any contractual capacity or supplier freeze horizons which may be enabled based upon the consolidated demand file. Finally, supply chain server 74 queries 144 whether the aggregated customer demand is greater than the supplier capacity. Supplier capacity may be determined from data supplied by suppliers to server 74 or by suppliers 76 allowing access to their respective databases by server 74. If the demand is not greater than the capacity, then supply chain server 74 branches to step 330 explained with reference to FIG. 10A. If the demand is greater than the capacity, then supply chain server 74 branches to a constrained supply planning routine 148 as is shown in FIG. 8.

Figure 8:
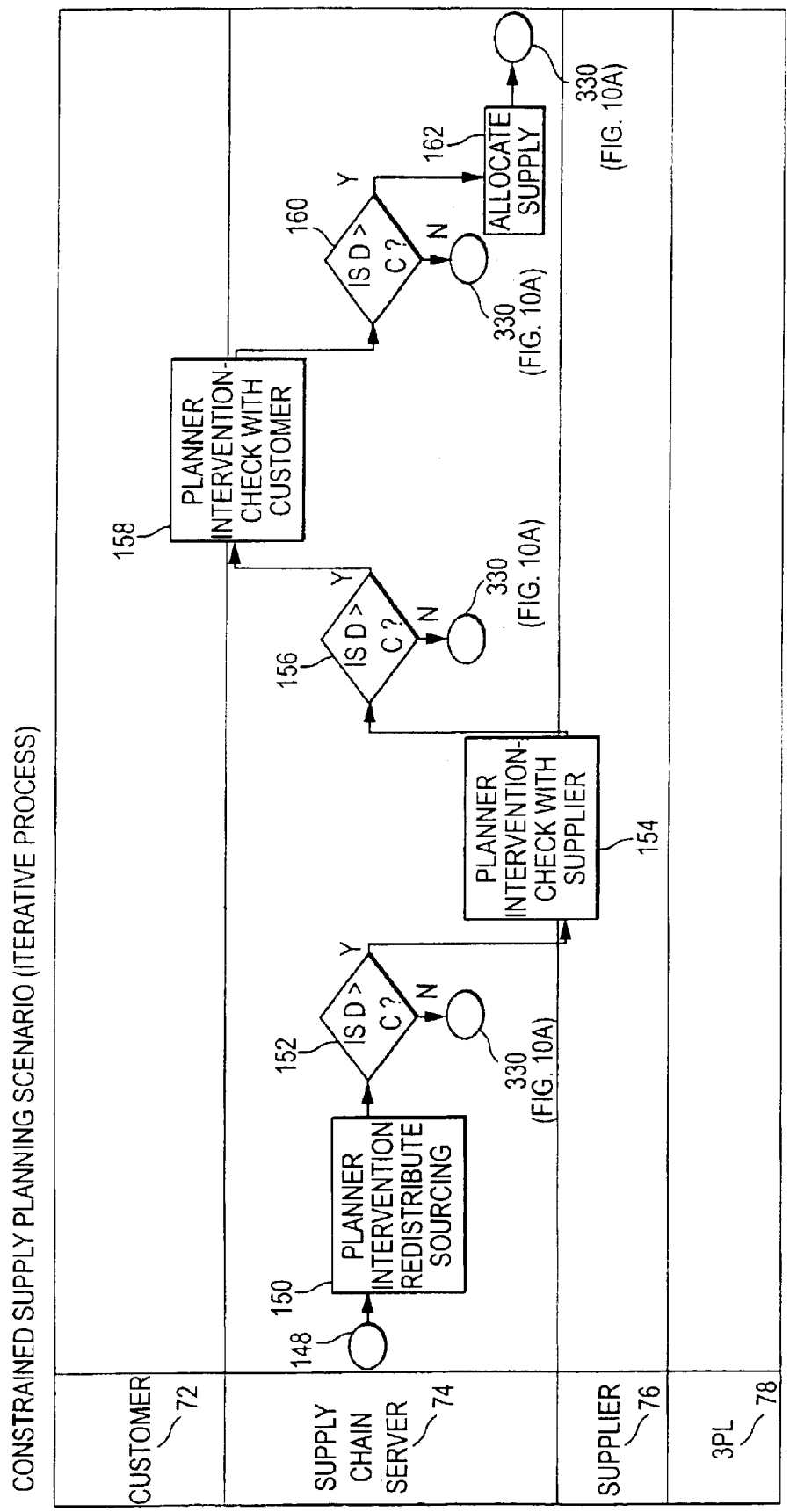
FIG. 8 is a diagram illustrating the processes performed during the Planning Module of FIG. 6 when customer demand exceeds supplier capacity.

Referring to FIG. 8, constrained supply planning routine 148 first redistributes 150 the customer demand in an attempt to ensure that there is no resultant imbalance between demand and supply. This redistributing is performed using an iterative process and a Planner using the Planner Tool (explained below with reference to FIG. 24) to determine alternate sources of supply in light of the suppliers' capacity and contractual frozen horizons. Supply chain server 74 then queries 152 whether the new resultant demand is greater than the suppliers' capacity. Again, if the demand is not greater than the capacity, supply chain server 74 branches to 330 in the Procurement Module. Otherwise, supply chain server 74 branches to supplier intervention 154. At supplier intervention 154, supply chain server 74 communicates with suppliers 76 to ascertain the situation causing the supplier's capacity to not equal the demand (e.g. raw material constraints or burst capacity issues) and evaluates possible alternatives (e.g. the potential to build ahead or store for future capacity increases). This may produce a new supplier capacity.

After contacting the supplier in supplier intervention 154, supply chain server 74 queries 156 whether the new capacity is less than the customers' demand. Again, if the demand is not greater than the capacity, supply chain server 74 branches to 330 in the Procurement Module. Otherwise, supply chain server 74 branches to customer intervention 158. In customer intervention 158, supply chain server 74 communicates with customers 72 to ascertain any possible customer flexibility (e.g. part substitutions, early or postponed delivery) to thereby produce a new customer demand. After contacting the customer at customer intervention 158, supply chain server 74 queries 160 whether the new customer demand is greater than the suppliers' capacity. Again, if the demand is not greater than the capacity, supply chain server 74 branches to 330 in the Procurement Module. Otherwise, supply chain server 74 branches to an allocate supply routine 162.

In allocate supply routine 162, the parts which actually are available from suppliers ("constrained parts") are allocated equally among the demanding customers and the forecasts of the customers are altered accordingly. In such an event, all demanding customers may receive an equal amount of the constrained parts, or the demanding customers may receive a pro rata share of the constrained parts based upon how many parts a particular customer requested in relation to how many parts other customers requested. Thereafter, supply chain server 70 branches to 330 in the Procurement Module.

Figure 9:
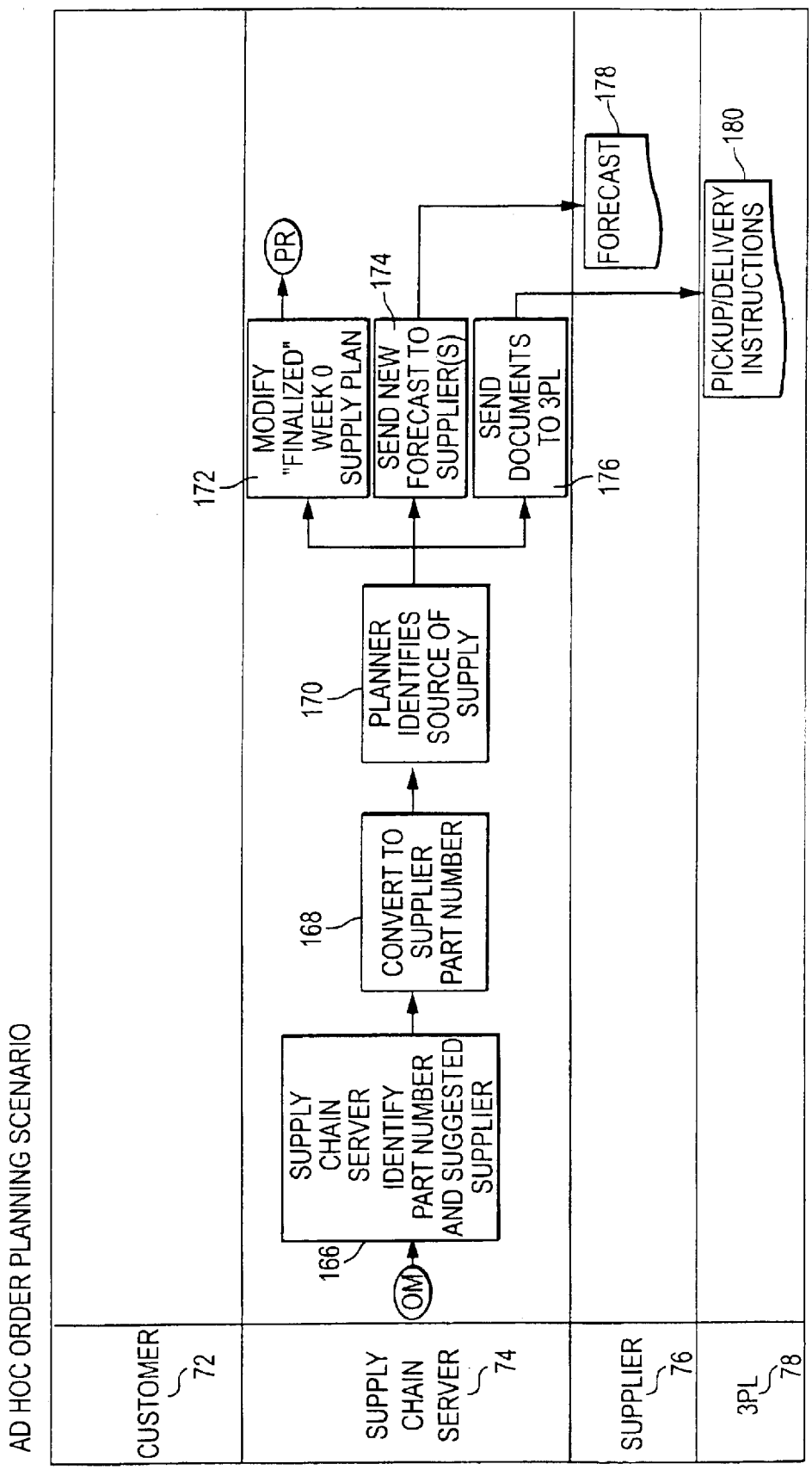
FIG. 9 is a diagram illustrating an example of the flow of information during the Planning Module of FIG. 6 upon receipt of an ad hoc customer request.

Aside from the normal planning scenario performed by supply chain server 74 in response to customer forecasts, as was detailed in FIGS. 7 and 8, the Planning Module can also process ad hoc customer demands. Referring to FIG. 9, there is shown the processes performed by supply chain server 74 in response to an ad hoc demand from customers. As with a typical order, supply chain server 74 receives a customer demand file from the Order Management Module. The demand file is then analyzed 166 to identify corresponding supply chain server supply numbers and suggested suppliers to provide the parts corresponding to the supply chain server supply numbers. The supplier identification is based upon contracts negotiated with the customer regarding preferred suppliers as was explained above. In analyzation 166, a unique identifier is assigned to represent the demand for each part from each customer during each week.

Supply chain server 74 then converts 168 the supply chain server supply number of the demand file into corresponding supplier part numbers. This conversion can be done using the customer part number as well. Thereafter, in an identification circuit 170, supply chain server 74 communicates with suppliers 76 and identifies various suppliers who may be able to provide an alternate supply for the ad hoc demand.

Thereafter, supply chain server 74 modifies 172 week 0 supply forecasts to produce a modified forecast 178 that reflects new quantities for both suppliers and customers. The modified week 0 forecast is also sent to the Procurement Module discussed below. Supply chain server 74 sends 174 modified forecasts 178 to suppliers along with a unique identifier assigned to represent a specific week's demand for each supplier—similar to a purchase order number. Finally, supply chain server 74 sends 176 documents 180 to 3PL 78 including pickup and delivery instructions for the ad hoc demand. The ad hoc demand orders will be sent directly to the customer and will generally not be sent through the cross dock described below.

Thus, by receiving and processing customer forecasts from a plurality of customers, and evaluating these forecasts with respect to an aggregation of suppliers' capacities, the Planning Module can produce a more effective and useful supply plan than that available in the prior art. Moreover, as the network is in contact with a plurality of suppliers, the Planning Module can shift allocation of customers' demands among suppliers to ensure that these demands are satisfied.

IV. Procurement

The Procurement Module executes the purchasing process. The focus of this function is on the purchase-to-pay cycle, including validation of the accuracy and timeliness of the order fulfillment process (the Fulfillment Module will be discussed more completely below). Additional areas covered by Procurement include communicating the supply order to suppliers (data interface) and reverse logistics.

Reverse Logistics is the process of moving products from their typical final destination to another point, for the purpose of capturing value otherwise unavailable, or for the proper disposal of the products. The following is a description of a preferred embodiment of the Procurement Process.

Supply chain server 74, at the completion of the Planning Module, transmits a supply plan (including the week 0 demand) to supplier 76 via EDI, Web, email or other means. After supplier 76 executes the supply plan and 3PL 78 picks up the shipments, supplier 76 transmits an ASN (Advanced Ship Notice) to supply chain server 74. Each ASN typically includes one line item and is received electronically, containing all the necessary data agreed upon during the contract negotiation process. The ASNs are validated against the supply plan, and exceptions are resolved by the planner. Valid ASNs are used to generate purchase orders (there is generally a one-to-one relationship between ASNs and purchase orders; all line items are identified using the supplier part number) and cross dock instructions (which will be transmitted to the 3PL). In parallel, a receipt is created in an ERP system. Unlike prior art supply chains, the invention uses a supplier ASN to trigger the generation of a purchase order and a receipt notice indicating possession of the demanded part. This reduces a large number of steps performed in prior art systems because demand is conveyed to suppliers which is more likely to be fulfilled as it is based upon a forecast and not a purchase order.

All payments received from customers during each day are listed and consolidated by supply chain server 74 for each supplier 76. If payment for a specific order has been received from customer 72 via EFT (Electronic Funds Transfer), supply chain server 74 uploads the payment files to a bank and supplier 76 is paid (e.g., once per day). The release of payment information automatically updates the ERP. Additionally, the bank sends a confirmation to supply chain server 74 showing the payment information. If the payment is to be made via check, a remittance advice notice and the check are printed and sent to the supplier.

If a customer decides they would like to return materials procured through supply chain network 70, the customer contacts supply chain server 74 to obtain a return authorization. Supply chain server 74 includes pre-authorized return authorizations from suppliers 76, and agreed upon terms for accepting returns. The supply chain server sends customer 72 the authorization, and sends a copy to supplier 76. If supplier 76 has an established returns process, supply chain server 74 will send customer 72 return instructions. Once the supply chain server has the POD (Proof of Delivery) from the supplier's carrier 96, supply chain server 74 will debit the supplier's account and issue a credit to the customer. Any credits or debits are first applied to any open invoices from the supplier.

If the Supplier does not have an established returns process, once the authorizations are in place, supply chain server 74 sends pick-up instructions to 3PL 78 if necessary. A determination must be made (1) whether the supplier has replacement parts in inventory and (2) whether the customer needs the replacements immediately or if the replacement parts demand can be added to the existing forecast. If the customer needs replacement parts immediately, the supplier's available inventory is the preferred source. If no inventory is available, the replacement parts should be built and delivered to the customer on an expedited basis. If the replacement parts are to be added to the existing forecast, the planning process continues with the additional demand incorporated into the next thirteen week forecast (see Planning Module description). Again, once supply chain server 74 has received the POD from 3PL 78, supply chain server 74 will debit the supplier's account and issue a credit to the customer. Any credits or debits are first applied to any open invoices form the supplier, and then to the supplier account (to any open invoices). These processes will now be explained by way of example.

Figure 10A:
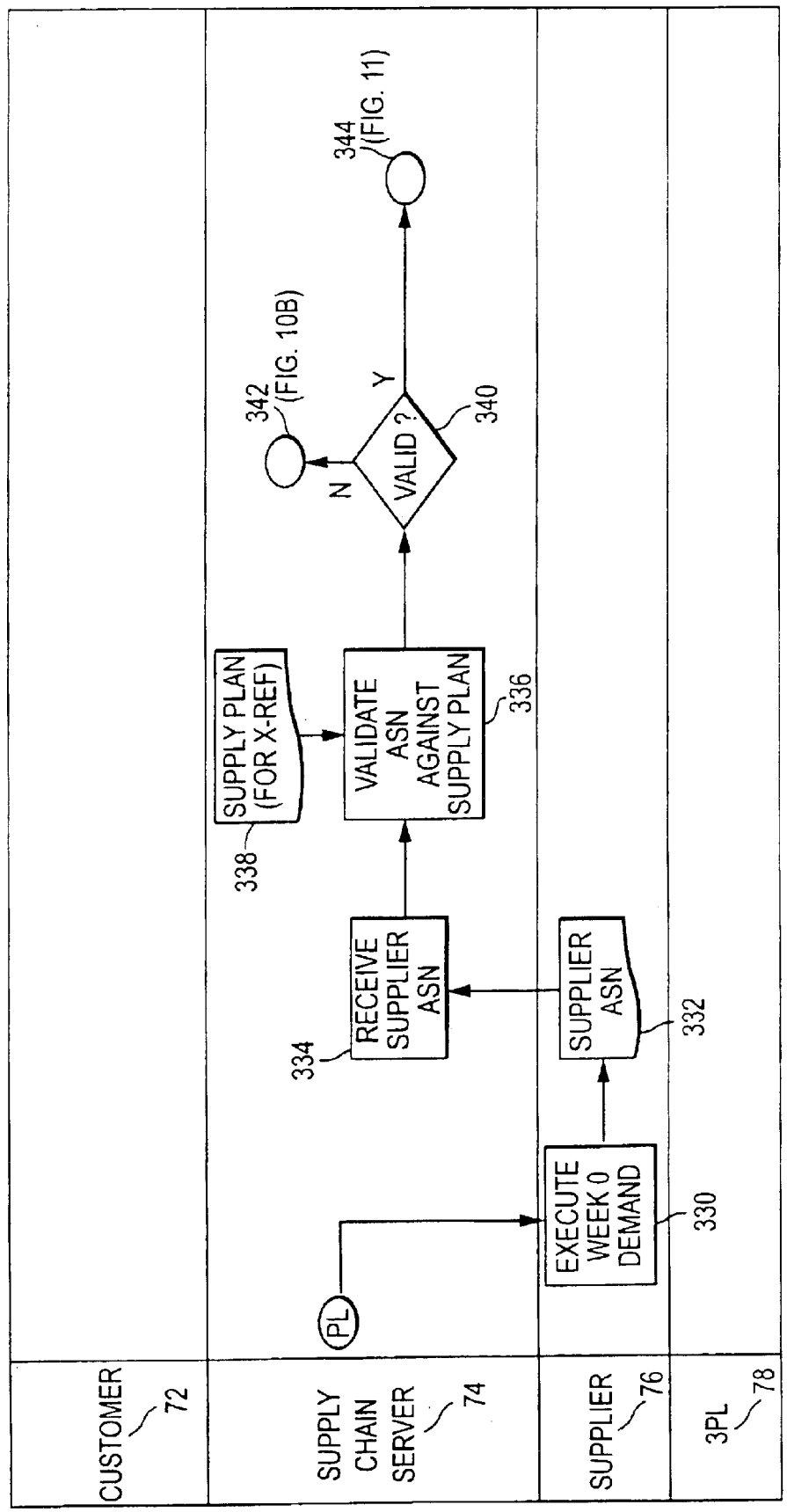
FIG. 10A is a diagram illustrating the processes of the Procurement Module in accordance with the invention.

Referring to FIG. 10A, there is shown the flow of information during the Procurement Module in accordance with the invention. After supply chain server 74 completes the operations involved in the Planning Module, the week 0 (or current week) supply demand is sent to the appropriate supplier 76. Supplier 76 executes 330 the week 0 demand, issues a supplier ASN 332 and sends ASN 332 to supply chain server 74. Supply chain server 74 receives supplier ASN 332 at 334. In general only one line item is included in each ASN 332. The ASN information itself is in the supplier's part number. If the supplier's ASN accuracy percentage is poor, or the supplier cannot send ASNs, a packing slip is used instead.

Supply chain server 74 validates 336 ASN 332 against a supply plan 338 generated by supply chain server 74 in response to customer forecasts. If the ASNs do not match supply plan 338 at 340, indicating that what was delivered by the supplier did not match what was ordered from the supplier, an error routine 342 is implemented and suppliers 76 are notified. In such an event, supply chain server 74 will have contractual options to, e.g., cancel the balance of the partial shipment immediately, return shipment, etc. Otherwise, supply chain server 74 branches to step 344 shown in FIG. 11.

Figure 10B:
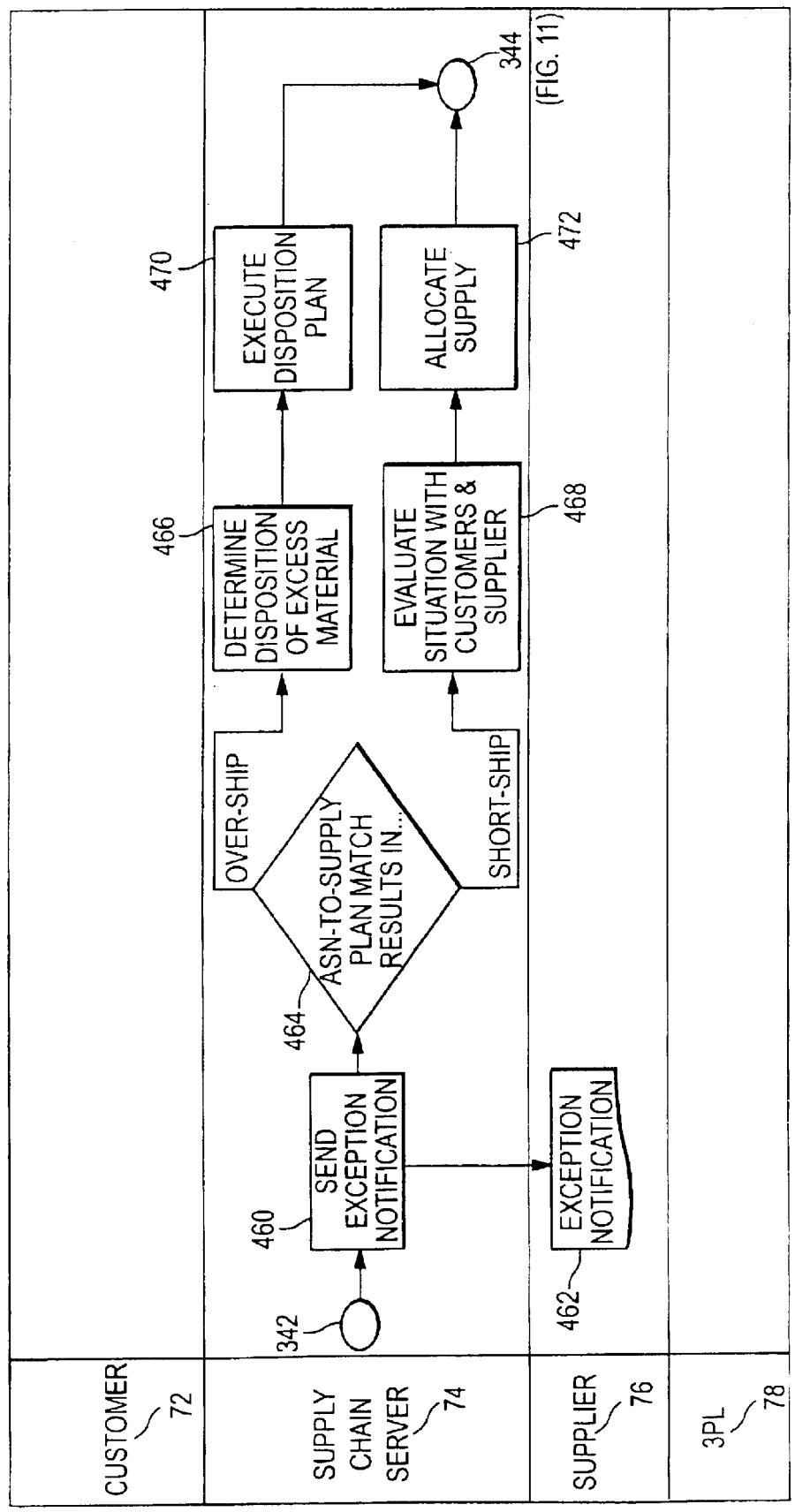
FIG. 10B is a diagram illustrating an error routine performed in the Procurement Module of FIG. 10A.

Referring to FIG. 10B, there is shown an example of error routine 342 in accordance with the invention. Supply chain server 74 sends 460 an exception notification 462 to supplier 76 alerting supplier 76 of the nonconforming shipment. Thereafter, supply chain server 74 determines whether the comparison of ASN 332 and supply plan 338 results in an over-shipment or a short-shipment—outside of predetermined tolerances.

If the comparison yields an over-shipment, control branches to step 466 where supply chain server 74 determines the disposition of the excess materials involved in the over-shipment. This is performed by having the Planner discuss the situation with supplier 76 and relevant customers 72 to determine the appropriate disposition of the excess materials. Thereafter, supply chain server 74 executes 470 the resultant disposition plan and then branches to step 344 shown in FIG. 11. Examples of the dispositions include returning excess material to the supplier, shipping the additional material to the customer (and adjusting any forecast as needed) or storing excess material at 3PL 78. Supplier 76 will be billed for any additional freight if the materials are returned to the supplier. Supplier 76 will also be billed any additional costs incurred in storing excess materials with 3PL 78.

If the comparison yields a short-shipment, supply chain server 74 evaluates 468 the situation by having the Planner communicate with supplier 76 and customer 72. This communication helps determine whether the short-shipment is merely a late shipment of whether the Planner must allocate further supply. The Planner may also discuss the situation with affected customers. Thereafter, supply chain server 74 allocates 472 to each customer a percentage of the available supply and control branches to step 344 shown in FIG. 11.

Figure 11:
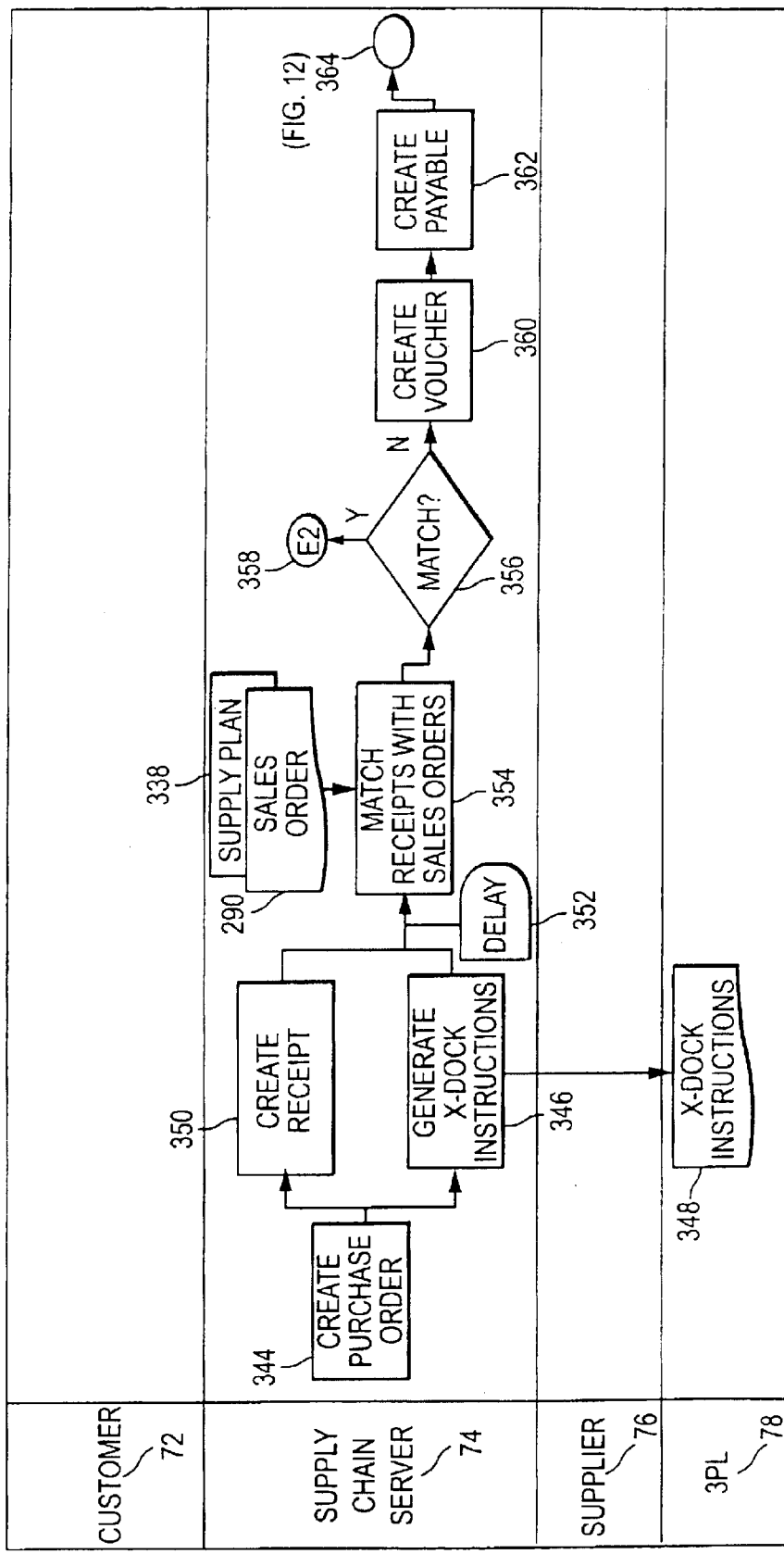
FIG. 11 is a diagram showing a continuation of the processes performed in the Procurement Module of FIG. 10A.

Referring now to FIG. 11, in step 344, supply chain server 74 creates a purchase order based upon ASN 332. The purchase order is created for each part for each supplier. Supply chain server 74 then creates 350 a receipt and generates 346 cross-dock instructions 348 based upon the purchase order 344. The receipt, like the purchase order, is organized by part and by supplier. Cross-dock instructions 348 may include pickup instructions for returns by customers. In situations of short shipment, cross-dock instructions 348 should reflect the Planner's allocations as discussed above. Upon receipt of a non-conforming shipment, 3PL 78 will notify supply chain server 74. A complete explanation of cross-dock instructions 348 is provided below in the discussion of the Fulfillment Module.

After an inherent delay 352 which insures that all week 0 demands are received and processed, supply chain server 74 matches receipts created in step 350 with supply plan 338 created earlier (See FIG. 10A) and sales order 290 discussed below in FIG. 17. The matching is done to verify that no material has been lost in transit. All sales orders that comprise one purchase order should be created before the matching is performed. If the documents do not match at 356, an error routine 358 is initiated. If receipts created at 350 are greater in number or price than sales order 290, possible causes of the problem could be a delay in the generation of the sales order. If the receipts are less than the sales order 290 in either number or price, possible causes of the problem include a data integrity issue or that material was lost at the 3PL or in transit. In any event, the Planner should intervene. If the receipts created in step 350 match 356 supply plan 338 and sales order 290 at 356 then supply chain server 74 moves to steps 360 and 362 where a voucher and a payable, respectively, are created.

Figure 12:
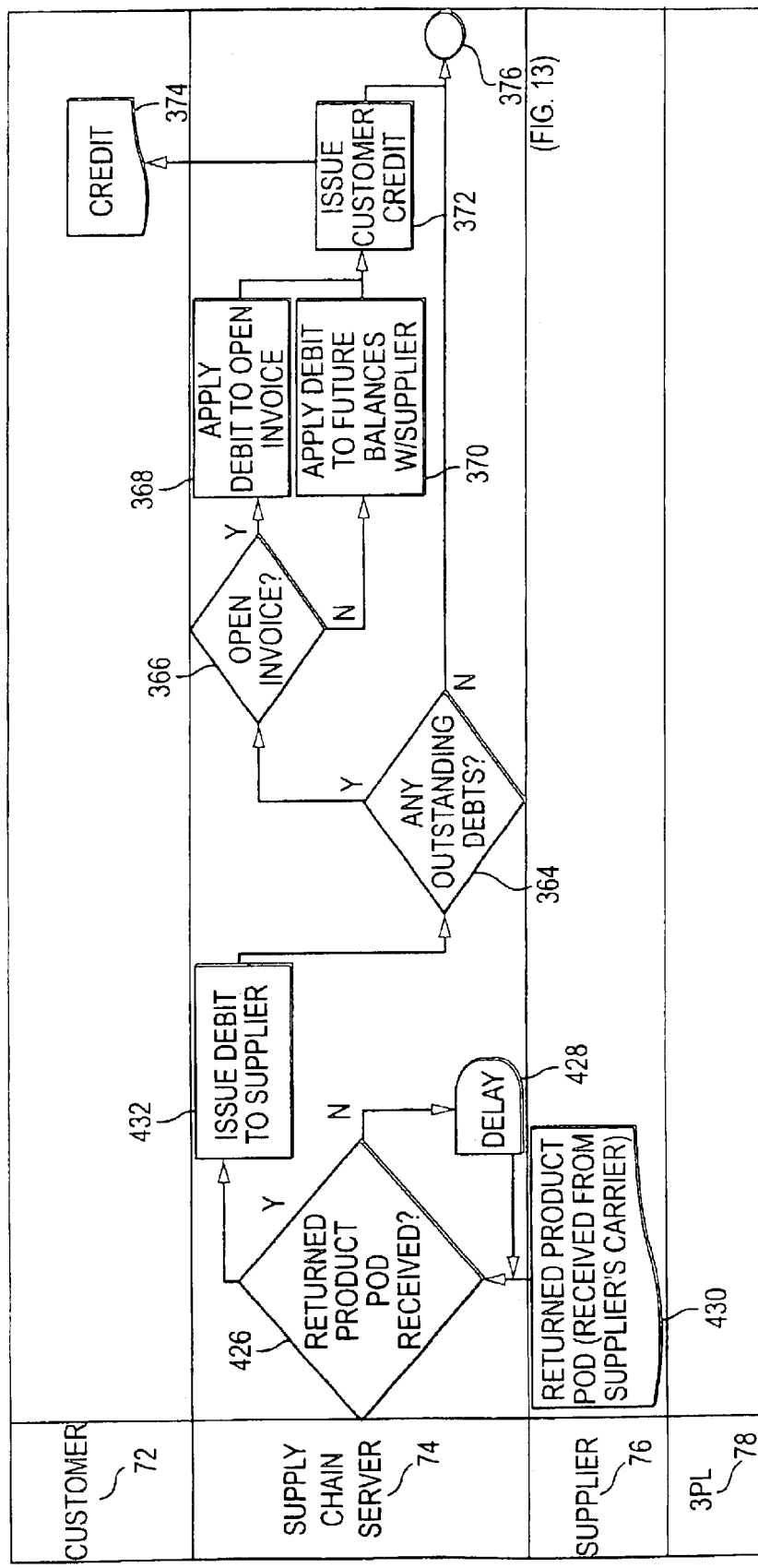
FIG. 12 is a diagram showing a continuation of the processes performed in the Procurement Module of FIGS. 10A and 11.

Supply chain server then branches, in FIG. 12, to query 364 and determines whether any debits (or credits) for the particular supplier are outstanding. If no debits are outstanding, control branches to step 376 (shown in FIG. 13). Otherwise, control branches to step 366 where supply chain server 74 determines 366 whether there are any open invoices for the particular supplier. If there are any open invoices, supply chain server 74 applies 368 the debit determined in step 364 to that open invoice and branches to step 372. Otherwise, supply chain server 74 applies the debit to future balances with the particular supplier and branches to step 372. At 372, supply chain server 74 issues 372 a customer credit 374 to customer 72. Thereafter, control of supply chain server 74 also branches to step 376.

Figure 13:
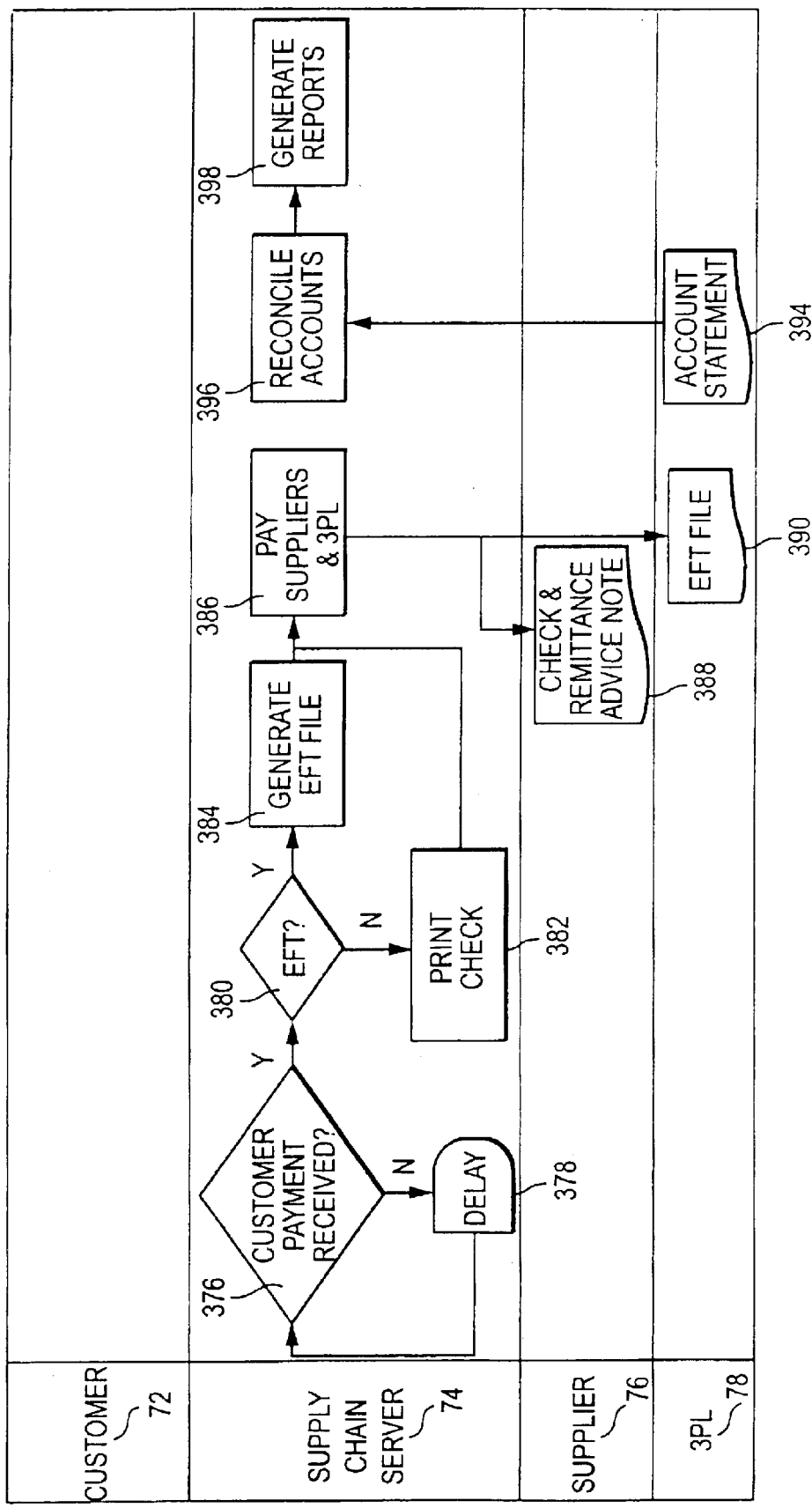
FIG. 13 is a diagram showing a continuation of the processes performed in the Procurement Module of FIGS. 10A, 11 and 12.

Referring now to FIG. 13, at step 376 supply chain server 74 queries whether payment from customer 72 has been received. If payment has not been received, supply chain server 74 waits a delay period 378 and then continues to query 376 whether customer payment has been received. The supplier payment is thus delayed until payment is received from the customer. The customer payments themselves are aggregated throughout the day. When payment is received, control branches to query 380 which determines whether the payment is through an EFT. If the payment is not through an EFT, supply chain server 74 prints check and remittance advice notices at 382 and then branches to step 386. Otherwise, supply chain server 74 generates 384 an EFT file and then branches to step 386. The EFT information for a specific supplier is part of a master data file. An EFT payment is sent to each supplier at the end of each day (based on the aggregation of payments from received from customers throughout the day).

Figure 21:
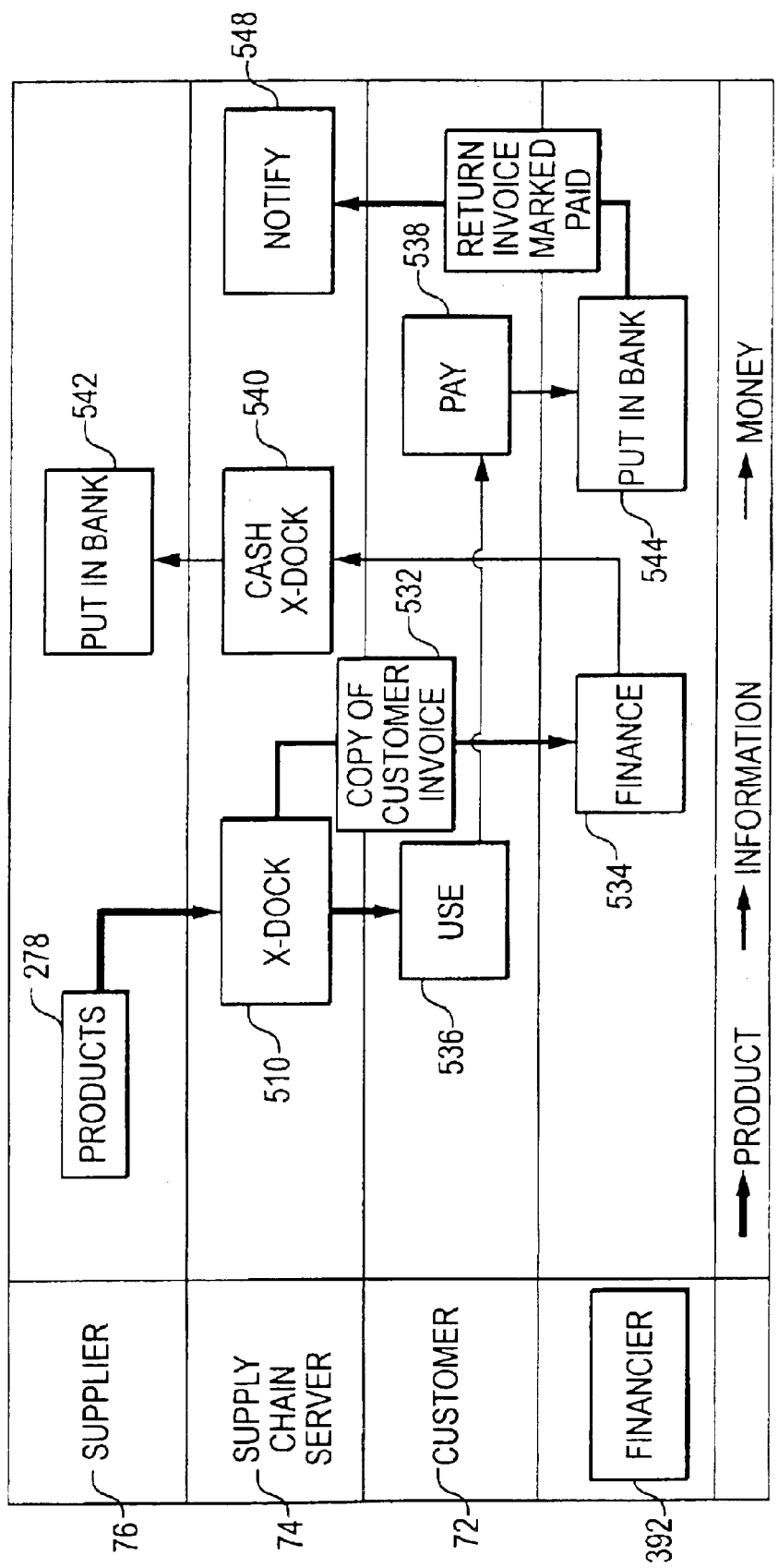
FIG. 21 is a diagram illustrating an alternative flow of title and payment for products in accordance with another embodiment of the invention.

At step 386, supply chain server 74 pays suppliers 76 and 3PL 78 with a check and remittance advice note 388. If the financing option discussed below with reference to FIG. 21 is implemented, supply chain server 74 also sends an EFT file 390 to a bank 392. EFT file 390 is sent to suppliers 76 once a day and to 3PLs 78 once a month—based on freight tables. Some time thereafter, an account statement 394 is sent to supply chain server 74. Supply chain server 74 receives account statement 394 and compares 396 it with the EFT File 390 which was transmitted to bank 392. Then, supply chain server 74 generates 398 reports including month-end, quarter-end, etc. reports.

Figure 14:
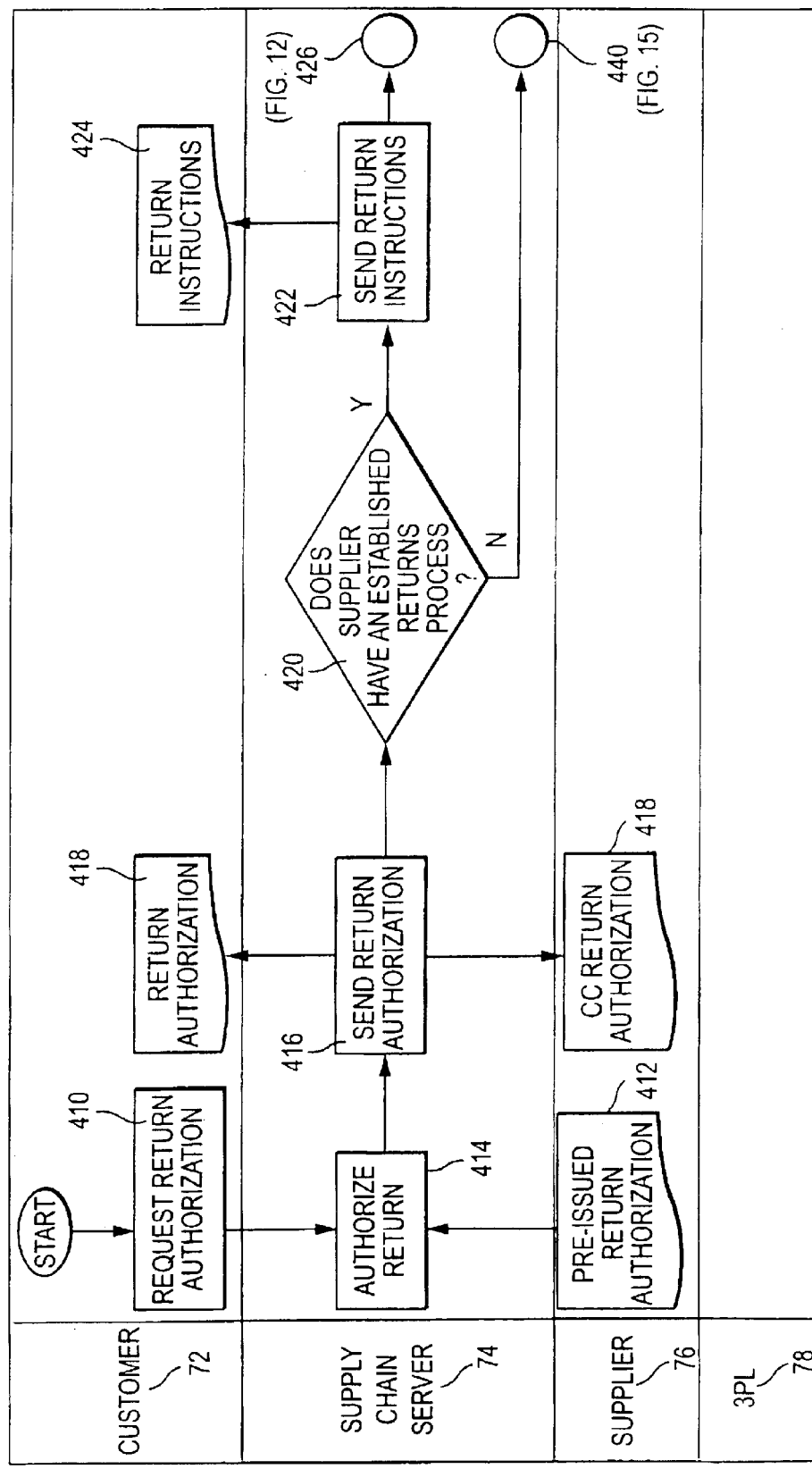
FIG. 14 is a diagram illustrating the processes performed by the Procurement Module when a customer desires to return an item procured through the supply chain network.

The Procurement Module is also used in situations where customer 72 desires to return materials obtained through supply chain network 70. Referring to FIG. 14, to initiate the return process, customer 72 makes a request 410 for authorization to return a part to supply chain server 74. Each supplier 76 provides supply chain server 74 with a pre-issued return authorization 412 for parts supplied by supplier 76. Supply chain server 74 receives request 410 and return authorization 412 and authorizes 414 the return of the materials using predetermined supplier-specific standards. Supply chain server 74 also uses a master supply record (not shown) to determine the source of the items to be returned. This master record shows which customers received products from corresponding suppliers and dates. In this way, supply chain server 74 can ascertain the origin of the product which the customer desires to return.

At step 416, supply chain server 74 sends 416 a return authorization 418 to both customer 72 and supplier 78.

Supply chain server 74 then queries 420 whether the supplier, whose materials are to be returned, has an established return process. If the supplier does have such a process, that process will be used and supply chain server 74 sends 422 corresponding return instructions 424 to the customer 72. Control then branches to step 426 shown in FIG. 12. Otherwise, if the supplier does not have an established returns process, control branches to step 440 in FIG. 15.

Referring again to FIG. 12, at step 426, supply chain server 74 queries whether a returned product Proof of Delivery 430 has been received from the supplier's carrier 96 indicating that the product was returned to the customer. If not, supply chain server 74 waits a delay period 428 and then continues to look for receipt of returned product POD 430. Clearly, if the returned product POD is never received, then no credit will be issued. When supply chain server 74 receives returned product POD 430, it issues 432 a debit to supplier 76 which is applied when the appropriate payables are processed. Control then branches to step 364 as was explained in detail above.

Figure 15:
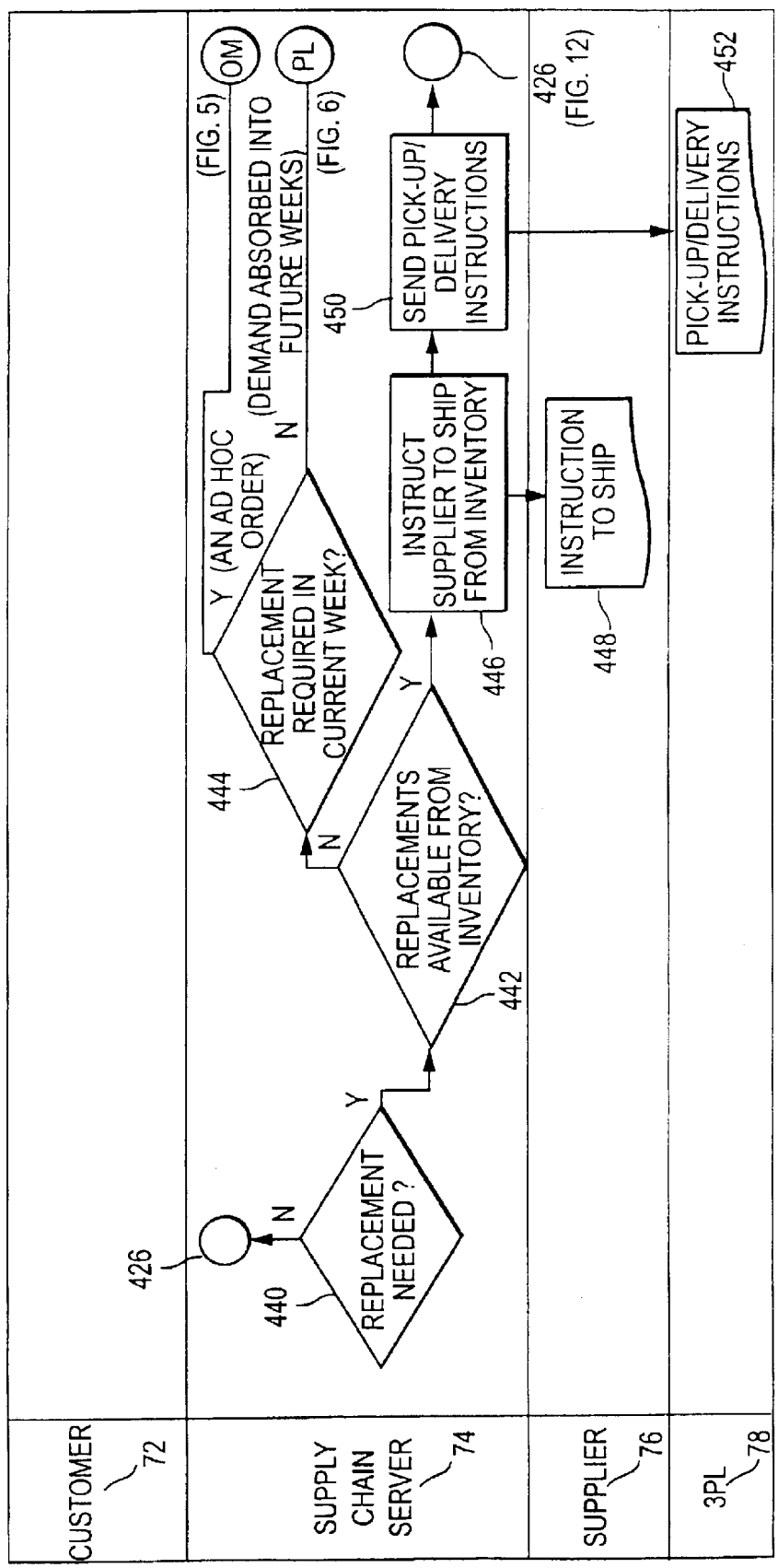
FIG. 15 is diagram showing a continuation of the processes depicted in FIG. 14.

Referring to FIG. 15, if the supplier does not have an established returns process, at step 440, supply chain server 74 determines 440 whether a replacement part is needed for customer 72. If no replacement part is needed, control branches to step 426 as was explained above with reference to FIG. 12. Otherwise, control branches to step 442 where supply chain server 74 determines whether replacement parts are available from any suppliers' inventory who has been listed as a customer's preference or which can provide immediate shipment. If parts are not available from inventory, control branches to step 444 where supply chain server 74 determines whether the replacement parts are required within the current week. If the parts are required within the current week, control branches to the Order Management module for an ad hoc demand as was described with reference to FIG. 5. If the parts are not required within the current week, control branches to the Planning Module and the demand is absorbed into future weeks forecasts as, for example, described in FIG. 6.

Returning to step 442, if replacement parts are available from inventory, supply chain server 74 sends 446 instructions 448 to supplier 76. Instructions 448 direct supplier 76 to ship the available replacement parts from its inventory immediately. In such an event, supplier 76 is responsible for shipping costs and uses 3PL 78. Supply chain server 74 also produces 450 pick-up/delivery instructions 452 which are sent to 3PL 78. Control then branches again to step 426 described above with reference to FIG. 12.

Thus, by centralizing processes which were performed separately by suppliers, 3PLs, carriers and customers in the prior art, the Procurement Module enables transfer of products between suppliers and customers more efficiently than prior art supply chains. Moreover, problems in shipment and returns by customers are also handled more expediently and efficiently.

V. Fulfillment

Figure 16:
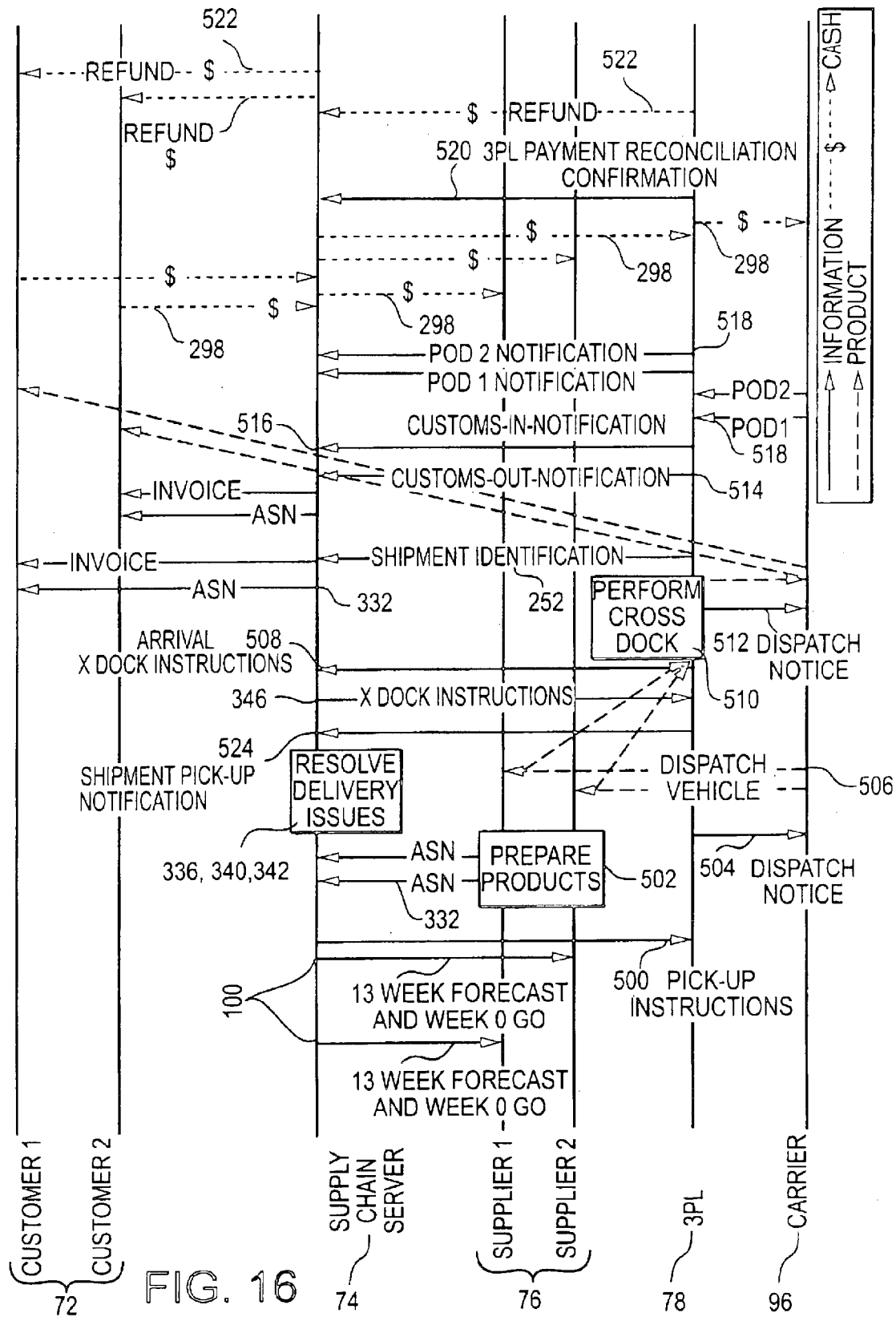
FIG. 16 is a diagram illustrating the flow of information and products during a Fulfillment Module in accordance with the invention.

The Fulfillment Module is involved in ensuring the transportation of products from suppliers 76 to customers 72. Referring to FIG. 16, there is shown a time-phased Fulfillment Module flow diagram in accordance with the invention. Much of the flow of information has already been described in detail with reference to the Planning, Order Management, and Procurement modules and so a detailed discussion of such information is omitted for the sake of brevity.

In the Fulfillment Module, supply chain server 74 sends customer forecasts 200 and week 0 callouts 202 (FIG. 4) to suppliers 76. Suppliers 76 send pick-up instructions 500 to 3PL 78 regarding the demanded products. Suppliers 76 then prepare 502 the products and send ASNs 332 (FIG. 10A) to supply chain server 74. Soon thereafter, 3PL 78 sends a dispatch notice 504 to carrier 96. Supply chain server 74 resolves delivery issues 336, 340, 342 (FIGS. 10A, 10B) while carrier 96 sends 506 dispatch vehicles to suppliers 76 to pick up the appropriate products. When the dispatch vehicles have obtained the products, a shipment pickup notification 524 is sent to supply chain server 74.

The dispatch vehicles travel to a designated cross-dock location (in this case, the 3PL is used as the cross-dock location though it should be clear that other locations could be used as is explained in more detail below) and await arrival of cross-dock instructions. Supply chain server 74 generates and sends 346 (FIG. 11) cross-dock instructions 348 to 3PL 78. When the dispatch vehicles arrive at the cross-dock location, they send an arrival notification 508 to supply chain server 74. At this point, a cross-dock 510 is performed.

Unlike prior art supply chains, in supply chain network 70, the orders of a plurality of customers 72, who order the same or similar parts, are grouped together into larger orders to be procured from suppliers 76. Suppliers 76 then ship, through 3PL 78, a much smaller number of larger orders of these parts. In the prior art, suppliers 76 handled each order individually and shipped each order in an individual box. This was very costly because it required significant management of all the orders and parts for many customers.

In the present invention, supply chain server 74 instructs 3PL 78 to pick up the larger orders from suppliers 76, take the orders to the cross-dock point, and then un-pack and sub-ship the products to customers 72. The cross-dock point may be strategically located to maximize the efficiency of the shipment to the customers. At the cross-dock point itself, there is an automated inspection, acceptance, etc. of the arriving products. Errors in the shipment are typically fixed at the cross-dock 510.

With respect to the products themselves, the operator of supply chain server 74 takes title for customers 72 when the product leaves suppliers' 76 dock. Title is transferred to customer 72 when the product arrives with the customer. The operator of supply chain server 74 also acts as the importer of record.

Focusing again on FIG. 16, after cross-dock 510 has been performed at the cross-dock point (in this case at 3PL 78), a dispatch notice 512 is sent to carrier 96 requesting a pick up of the products and a shipment notification 262 (discussed below with reference to FIG. 17) is sent to supply chain server 74. The products are then picked up by carrier 96 and transported to the appropriate customers 72. Customers 72 may request a desired pickup or delivery location. While the products are being transported, supply chain server 74 sends ASN 332 (FIG. 10A) to customers 72. 3PL 78 may also send a customs in notification 514 and a customs out notification 516 to supply chain server 74 as appropriate. Such information would then be available to customers 72. After the products are dropped off with customers 72, carrier 96 sends a proof of delivery notification POD 518 to 3PL 78. 3PL 78 forwards POD 518 to supply chain server 74.

Thereafter, customers 72 send payment 298 (FIG. 24) to supply chain server 74 and supply chain server 74 forwards payment 298 (minus management fees) to suppliers 76, 3PL 78 and carrier 96. 3PL 78 then sends a payment reconciliation notification 520 to supply chain server 74. If any refund is necessary, 3PL 78 sends such a refund 522 to supply chain server 74. Supply chain server 74 then forwards refund 522 to customers 72.

Customers 72 using supply chain server 74 also have the ability to track the status of an order throughout the Fulfillment process. This order tracking capability may be offered to all the customers 72 using supply chain server 74 via an Extranet discussed below.

Thus, by providing suppliers with a smaller number of larger orders, and breaking down the larger orders at a cross-dock point, a less costly and more efficient Fulfillment process is available than in the prior art. Additionally, by having customers, suppliers, 3PLs, and carriers all report to a centralized supply chain server, all parties can receive current information concerning shipment processes. In one embodiment, such information is easily made available on a web site with information populated by the supply chain server.

VI. Billing and Payment

Once customer demand is fulfilled, the Billing and Payment Module is responsible for defining the rules and activities used in performing financial transactions such as billing and processing of customer payments. An additional offering of the Billing and Payment Module is to enable the supply chain network's customers to view the status of pending orders and track the status of an order up until the time the customers receive their product.

In general, after customer demand is fulfilled and a shipment notification from 3PL 78 is received, supply chain server 74 triggers the generation of a sales order. At the same time, the shipment notifications are reviewed to determine any deviations between expected and actual customer shipments. This process helps to identify any short shipments or damage done to products either in transit or at the 3PL facility.

A customer may receive several shipments from suppliers via supply chain network 70 on a given day. However, the customers preferably receive one invoice per day that consolidates those shipments into a single bill. All financial transactions between supply chain server 74 and customers 72 can be, in a preferred embodiment, performed by using EFT (Electronic Funds Transfer), thereby further reducing overall cycle time.

Figure 17:
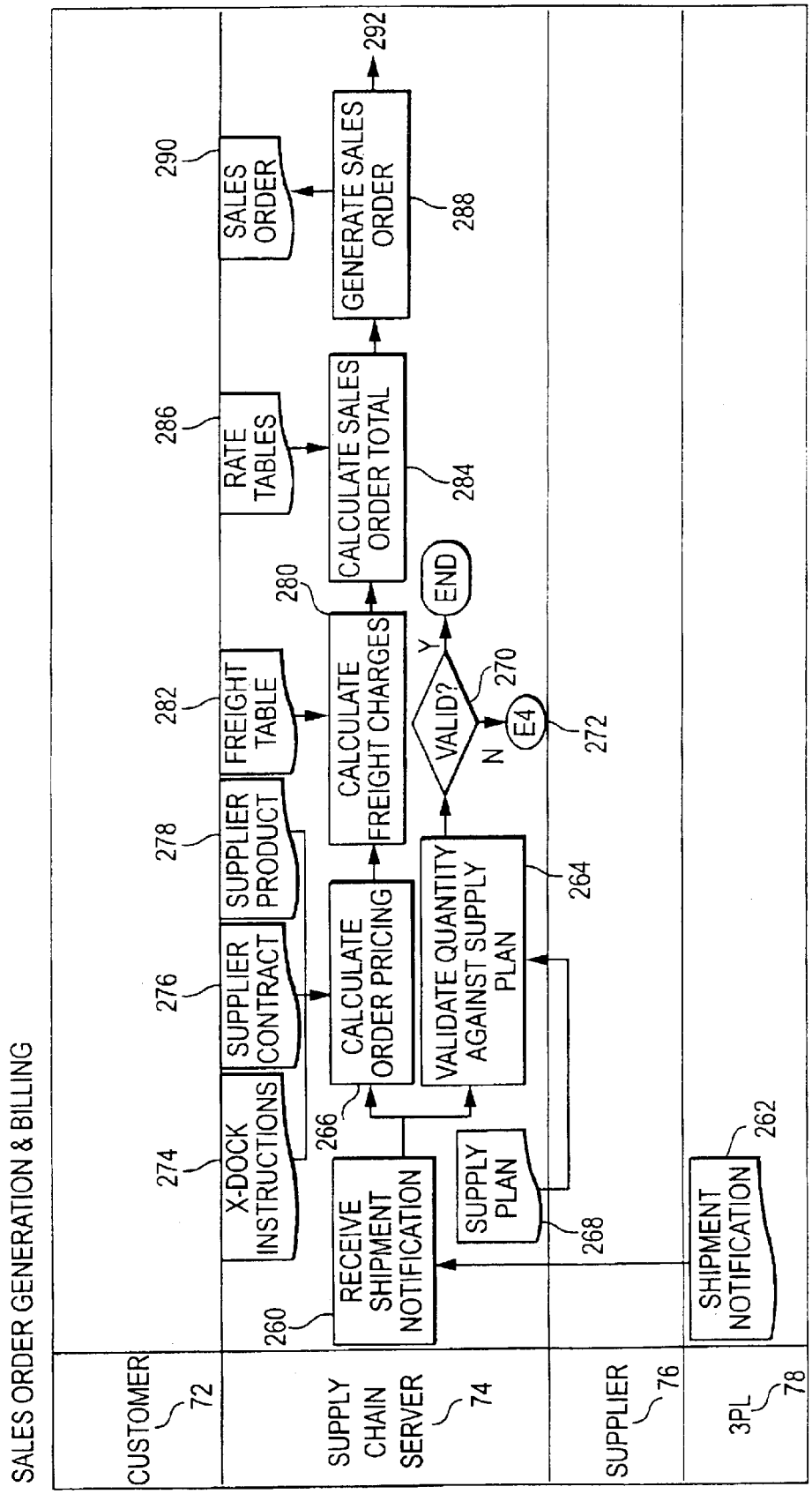
FIG. 17 is a diagram illustrating the production of invoices performed by a Billing and Payment Module in accordance with the invention.
Figure 18:
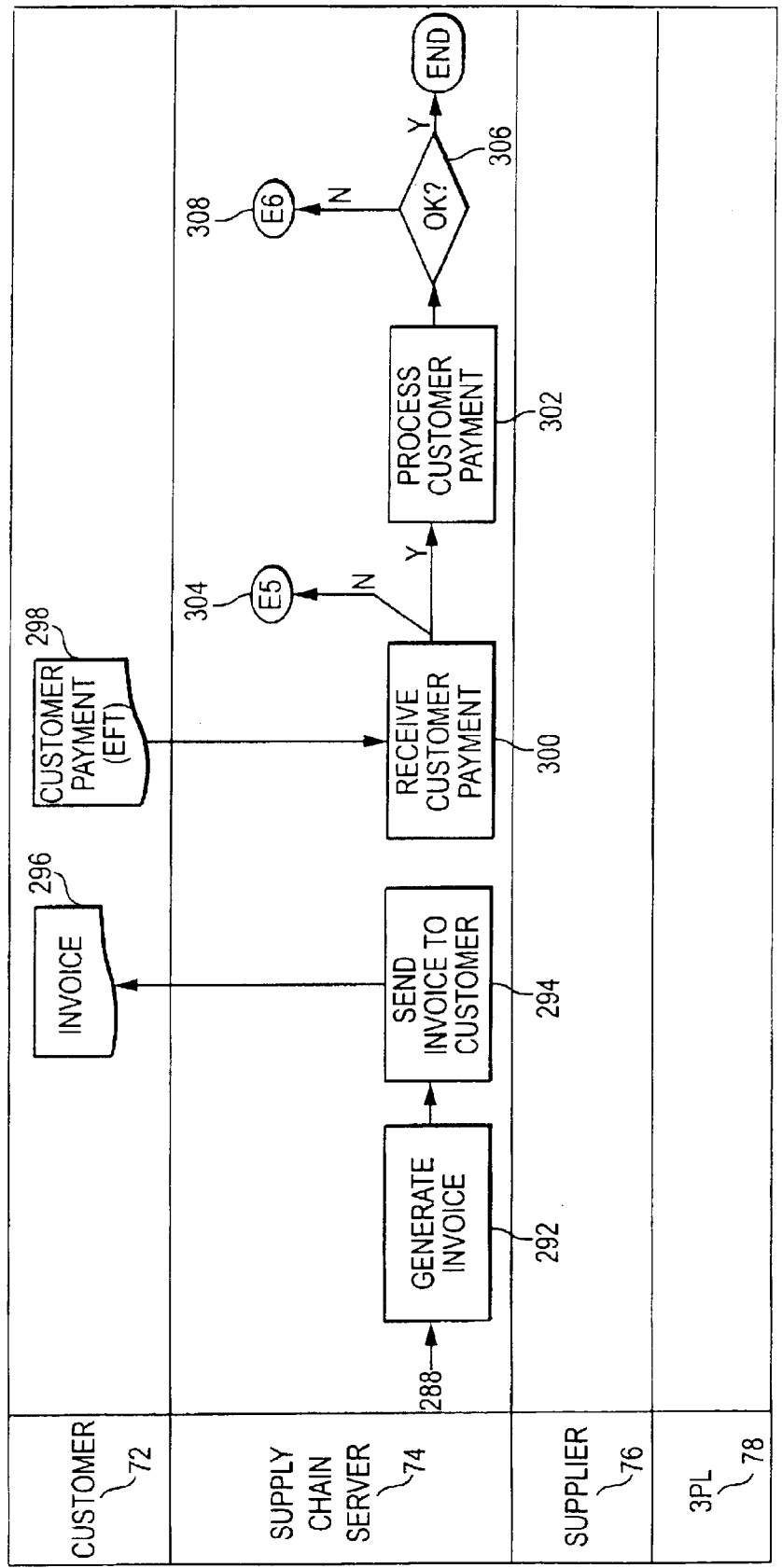
FIG. 18 is a diagram showing the payment of invoices during the Billing and Payment Module.

Referring now to FIGS. 17 and 18, the Billing and Payment Module, begins with supply chain server 74 receiving 260 a shipment notification 262 from 3PL 78 indicating that the products have been delivered to customer 72. The receipt 260 may be through an EDI. Supply chain server 74 validates 264 shipment notification 262 and calculates 266 the order pricing of the shipment. In validation 264, supply chain server 74 compares the total quantity in shipment notification 262 with a quantity specified in supply plan 338 (see FIG. 11). The comparison could include more than one shipment notification per customer part number, and should take into consideration pre-defined tolerances. If supply chain server 74 determines 270, that the shipment notification is valid, validation 264 ends. Otherwise, an error routine 272 is performed as was explained above with reference to FIG. 10B for error routine 342. If an error did occur, this is indicative of a data integrity issue (shipment notification accuracy) or a 3PL performance issue (material lost or damaged at 3PL facility or in transit). In any event, Planner intervention is used to implement both short and over shipment resolutions in error routine 272.

In calculate order pricing circuit 266, the price of the order associated with shipment notification 262 is calculated based upon cross-dock instructions 346 (FIG. 16), a contract 276 between the supplier 76 and customer 72, and the actual product 278 that was shipped. This cost is based on the number of components purchased and prices negotiated with supplier 76. Additional costs are added for services not included in the basic management fee. These could include, for example, expedited delivery, special labeling or packaging, etc. Finally, an ad hoc order may be given an additional charge.

In addition to the charges for the products themselves, supply chain server 74 also calculates 280 the freight charges associated with shipping the products based upon a freight table 282 having standard freight charges. In general, freight charge is based upon weight, number of pieces in the shipment, and the freight type (e.g., a pallet, package, etc.). A reconciliation may be used periodically to make adjustments to the customer's accounts based upon reconciliation by 3PL 78. Some prior art techniques generated sales orders too soon and so freight charges needed to be applied after the sales order. As can be discerned, such a problem is not present in the architecture of the present invention.

Then supply chain server 74 calculates 284 the sales order total using applicable rate tables 286. These tables are used to calculate custom duties and exchange rates. Insurance charges are added, as well as value added taxes and sales taxes. Supply chain server 74 then generates 288 a sales order 290. In a preferred embodiment, a single sales order is generated per customer part number and the charges are itemized—for example, freight, taxes, additional services, etc.

Referring now also to FIG. 18, supply chain server 74 then proceeds to steps 292 and 294 where it generates 292 and sends 294 an invoice 296 for sales order 290 to customer 72. The generation 292 of invoices will be performed automatically for each order using electronic invoice outlining terms for each sales order. The payment terms are based on the shipment date and will include itemized charges as referenced above. With respect to the sending 292 of invoice 296, all invoices going to the same customer should be consolidated every day and so the customer will receive one invoice per day. Sending 292 thus creates a receivable.

At some point thereafter, customer 72 sends a customer payment 298 to supply chain server 74 preferably through an electronic funds transfer (EFT). Supply chain server 74 attempts to receive payment 298 at 300. If payment 298 is not received within a contractually defined period of time, an error routine 304 is performed where supply chain server 74 contacts either the customer or the corresponding bank. If payment 298 is received within the defined period of time, payment 298 is processed 302 so that incoming payments are matched with open invoices. The account of the customer who sent in payment 298 is reviewed for any other outstanding invoices (credit or debit balances) and payment 298 is applied to that customer's account. Finally, at 306, supply chain server 74 determines whether customer 72 made a full payment or overpaid for a given invoice 296. If there was no problem with payment 298, the invoice routine ends. Otherwise, error routine 308 is implemented where either a collection process is initiated based on the customer's past history or a credit is applied to the customer's account in the event of an overpayment. As a plurality of suppliers 76 may have provided parts for customer 72, payment 298 may relate to a plurality of suppliers 76 and may need to be broken up and distributed to suppliers 76 accordingly.

Thus, the centralization of control of supply chain network 70 in supply chain server 74 allows suppliers to avoid the costs incurred in managing billing processes with customers.

VII. Information Management

Supply chain server 74 accumulates valuable data that can be provided to the supply chain network participants. In a preferred embodiment, the information delivery capability is implemented primarily by a secure Extranet site. Information delivery is very useful to a supply chain network's business model, as an efficient supply chain network incorporates both accessibility to, and visibility of, real-time information.

Information delivery, rather than being a discrete process that happens periodically, is a capability that enables an essentially continuous communication of information between supply chain server 74 and its business partners, (e.g., 24 hours-a-day, 7 days-a-week). In addition, the information delivery capability provides the means for customers (and potentially suppliers and 3PLs) to initiate workflow processes. For example, although the process for the customer's ability to abort an order is located in the Planning Module, information delivery will handle the communication of the abort code (e.g. a button on the Extranet that triggers an email or EDI message to initiate the work flow). FIG. 19 shows some information which can be provided to users of supply chain network 70. The information delivery process allows information to be delivered in a very timely manner, according to the needs of the supply chain network participants.

As can be discerned, the type of information available to Customers, Suppliers and the 3PL includes but is not limited to: order-specific information/statistics and customer-specific statistics (e.g. Week-to-date, Month-to-date, Year-to-date, etc.).

VIII. Financing

The structure of supply chain network 70 also enables (but does not require) the possibility of providing new forms of financing for customers procuring products. As stated above, in prior art forms of financing, a supplier gave a customer a payment term which was frequently ignored by the customer. Suppliers would therefore increase the prices of products (de facto interest) to compensate for prospective losses due to buyers not paying on time. Sellers were also at the mercy of unreasonable prices from distributors when sellers wished to sell products early to improve their balance sheets.

Figure 20:
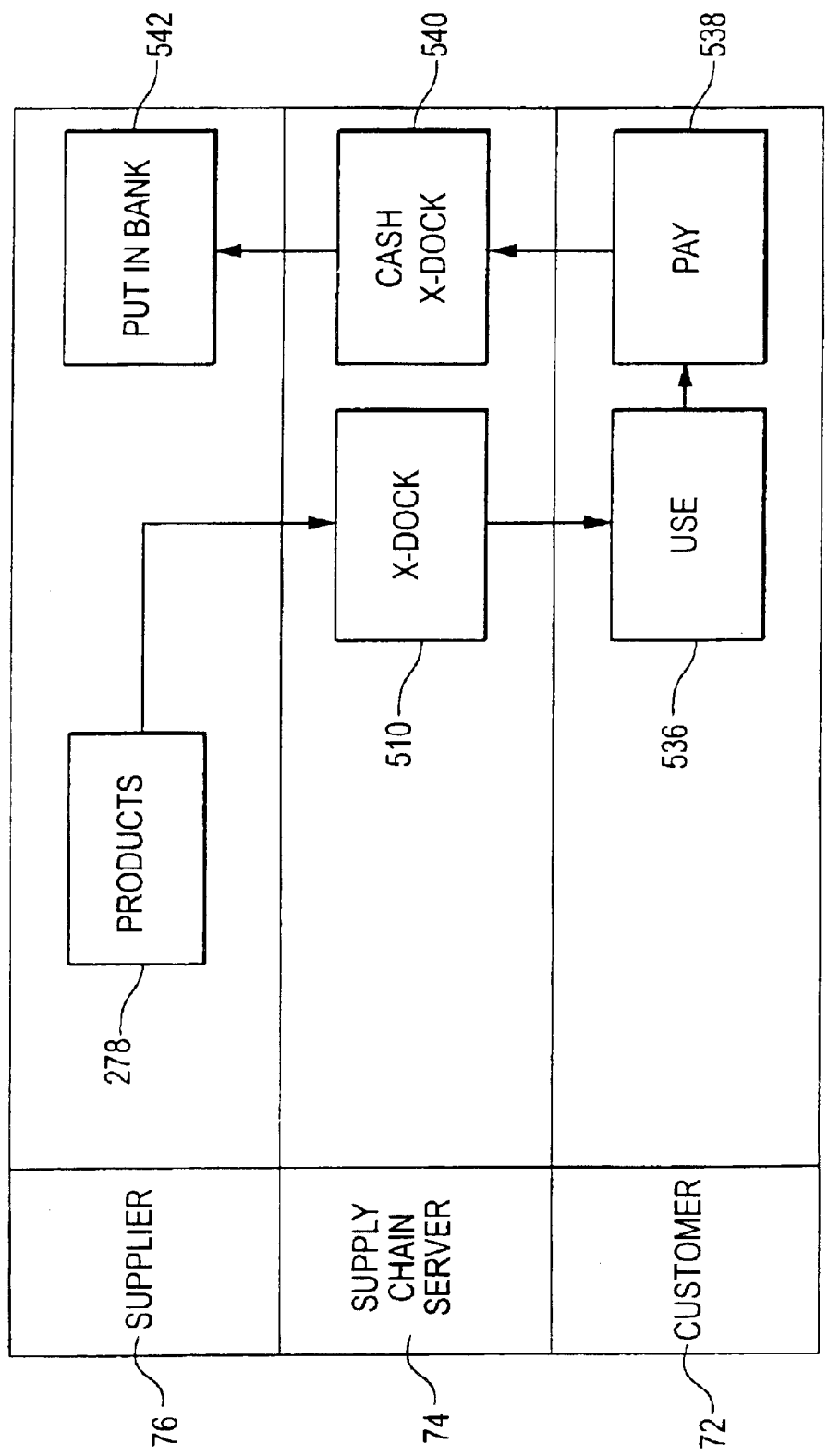
FIG. 20 is a diagram illustrating the flow of title and payment for products in accordance with an embodiment of the invention.

The invention, in providing a three party architecture (instead of just the supplier and customer of the prior art) removes the de facto interest and the prior art distributor. Referring first to FIG. 20, there is shown one example of the flow of title and payment in supply chain network 70. As stated above in the description of the Fulfillment Module, the operator of supply chain server 74 takes title of products 278 once products 278 leave supplier 76. Products 278 travel to cross-dock 510 and then to customer 72. Customer 72 uses 536 the products and sends payment 538 to supply chain server 74 (e.g., at the cross-dock point). Supply chain server 74 receives 540 payment 538 and sends it to supplier 76. Supplier 76 receives payment 538 and deposits 542 the payment in the supplier's bank.

An alternative form of financing is shown in FIG. 21. As with the flow shown in FIG. 20, products 278 are sent to cross-dock 510. At that time, a copy of the customer invoice 532 is sent to a financier or bank 392 as collateral for payment of the customer's invoice. Bank 392 procures the necessary financing 534 for customer invoice 532 and sends it back to supply chain server 74 at 540. Supply chain server 74 then forwards financing 534 to supplier 76 who then deposits 542 financing 534 in the supplier's bank. Supplier 76, therefore, gets paid soon after products 278 are shipped.

Bank 392 effectively loans customer 72 the financing needed to pay supplier 76 and supply chain server 74 secures this obligation of customer 72. Customer 72 continues to use 536 products 278 and then produces payment 538 which is now sent directly to bank 392. Bank 392 deposits 544 payment 538, sends 546 invoice 532 back to customer 72 marked as paid and sends a notification 548 to supply chain server 74 indicating that invoice 532 was paid.

In this way, once product 278 is delivered, customer 72 still has a payable on its records, even though supply chain server 74 is securing an obligation on the customer's behalf. The payable itself is actually to supply chain server 74 or bank 342 and not to supplier 76. Such a payment schedule is extended to customers with exemplary credit. Further, if the customer does not pay on time, supply chain server 74 has the option to hold back on the flow of parts to customer 72 thereby causing customer 72 great expenses. Supplier 76 benefits in that it receives an earlier and regular payment. As supply chain server 74 pays suppliers 76 on time, suppliers 76 no longer need to charge de facto interest. This cost savings is passed to customer 72 and realized as profit for the operator of supply chain server 74.

When suppliers 76 desire to ship products 278 before a time necessary to satisfy customers 72, supply chain server 74 can safely retain some of these products based upon customer forecasts 200 and charge a lower interest rate to suppliers 76 than that charged by distributors of the prior art.

Using the above described techniques, supply chain server 74 can arrange payment term financing in order to leverage more favorable pricing or to create a more appealing balance sheet for the parties involved. For example, as suppliers can be paid sooner than in prior art supply chains, suppliers are more willing to allow for price concessions and lower financing costs. Supply chain server 74 can arrange financing that permits inventory to be taken off balance sheets and off premises.

Supply chain server 74 can also shift the risks in changes in commodity pricing to more risk inclined parties. For example, in volatile commodities (e.g., Dynamic Random Access Memories—DRAMs), by controlling the flow of products and cash, server 74 can also provide risk shifting products such as hedges, calls, puts, etc. Prior art supply chains could not provide such products because there was not a single party who controlled products and cash.

Server 74 can also provide insurance that was not available in the prior art. As server 74 is connected with multiple customers and suppliers, server 74 can plan for volatile swings in demand or supply of products. For example, server 74 can receive extra products from suppliers and retain these products in case customers experience an unforeseen increase in demand. The extra products received by server 74 are determined by actuarial calculations based upon prior forecasts. These extra products are updated periodically so that they remain fresh and not outdated. In this way, server 74 insures for demand spikes and supply shortages.

Thus, the provision of supply chain server 74 enables the parties of the supply chain network to use financing options not available in the prior art. Additionally, suppliers can provide products more cheaply because de facto interest is no longer necessary.

IX. Architecture

Figure 22:
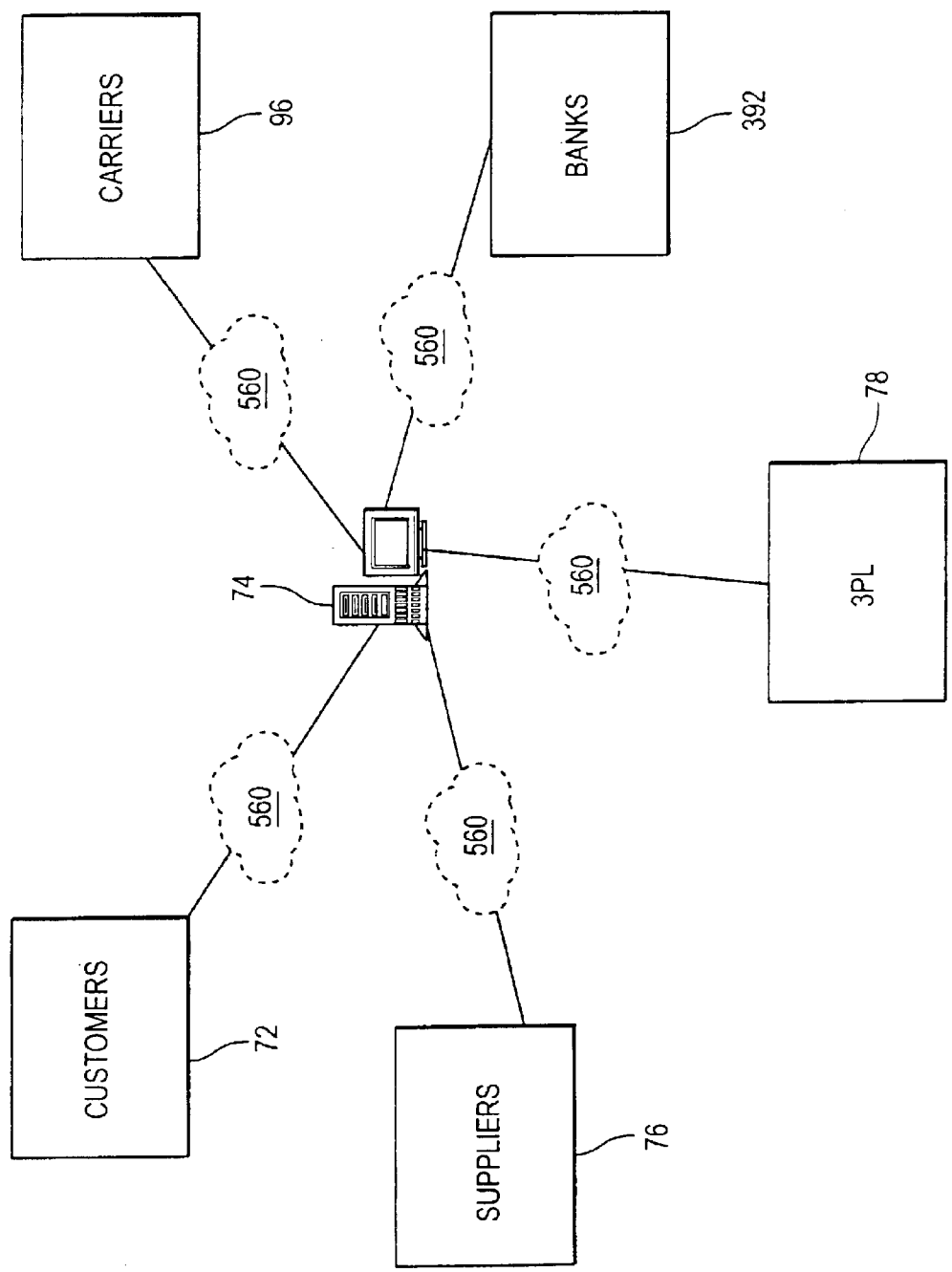
FIG. 22 is a diagram illustrating an embodiment of the architectural set up for the supply chain architecture in accordance with the invention.

Supply chain network 70 can be set up in many ways. A general architectural set up is shown in FIG. 22. Supply chain server 74 is shown coupled to all of customers 72, suppliers 74, 3PL 78, banks 392 and carriers 76. This connection could be through, for example, a network 560 such as the Internet.

If network 560 is used, the, communication among the parties shown in FIG. 22 could be through any know arrangement for accessing a communication server, such as dial-up serial line interface protocol/point to point protocol ("SLIP/PPP"), an Integrated Services Digital Server ("ISDN"), a dedicated leased-line service, broad band (cable) access, a Digital Subscriber Line ("DSL"), asynchronous transfer mode ("ATM") or other access techniques. If supply chain server 74 is used to host a web page that is accessed by one of the parties of FIG. 22, supply chain server 74 should be able to provide web page HTML and/or Java data. Supply chain server 74 is not limited to such hardware requirements.

Figure 23:
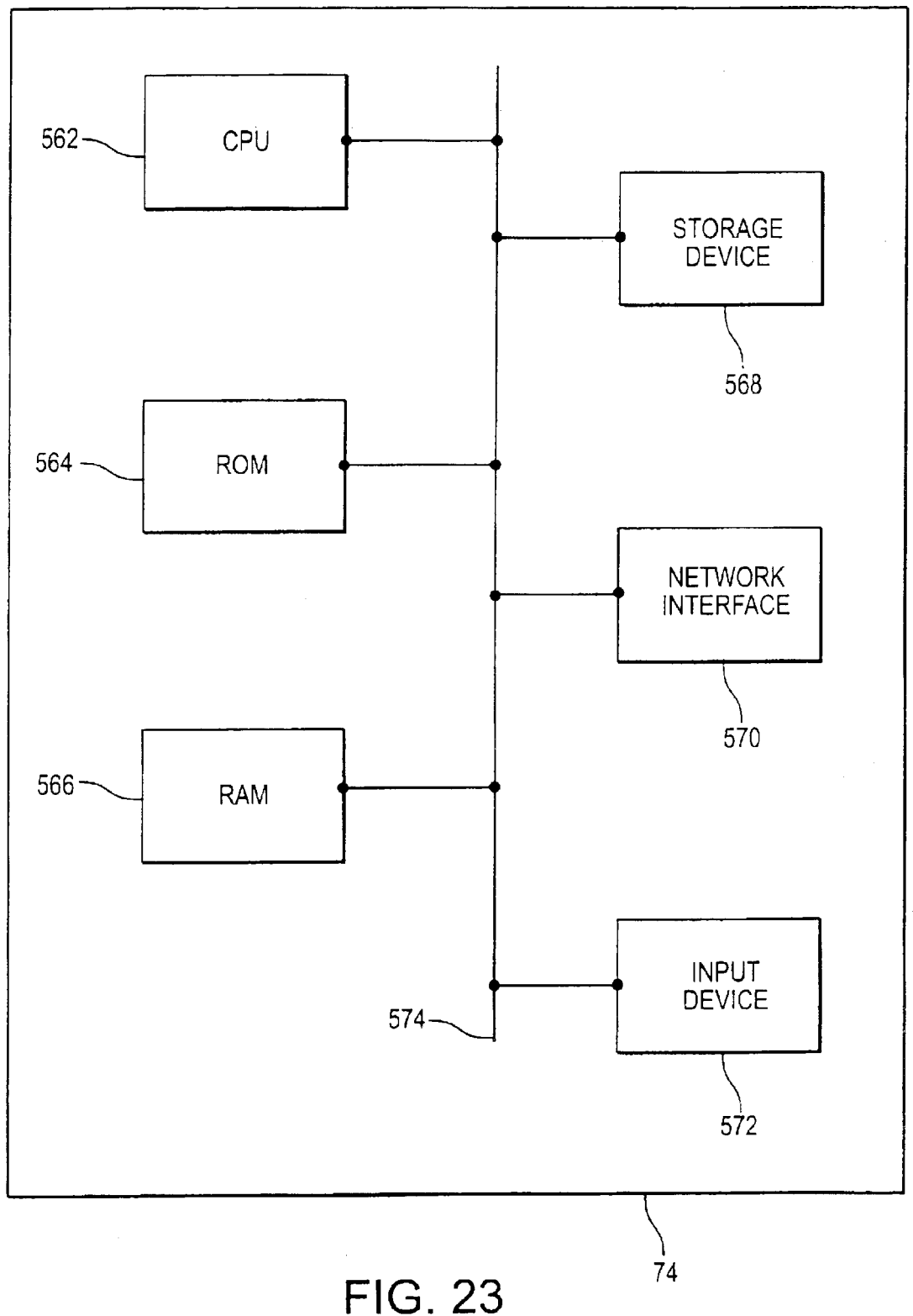
FIG. 23 is a diagram illustrating an embodiment of a supply chain server in accordance with the invention.

Supply chain server 74 itself can be implemented using many known hardware structures. In its most general sense, supply chain server 74 can be implemented using a structure like that shown in FIG. 23. A CPU 562 is coupled to a ROM 564, a RAM 566, a storage device 568, a server device 570 and an input device 572 through a bus 574. Again, supply chain server 74 is not limited to these structures.

Figure 24:
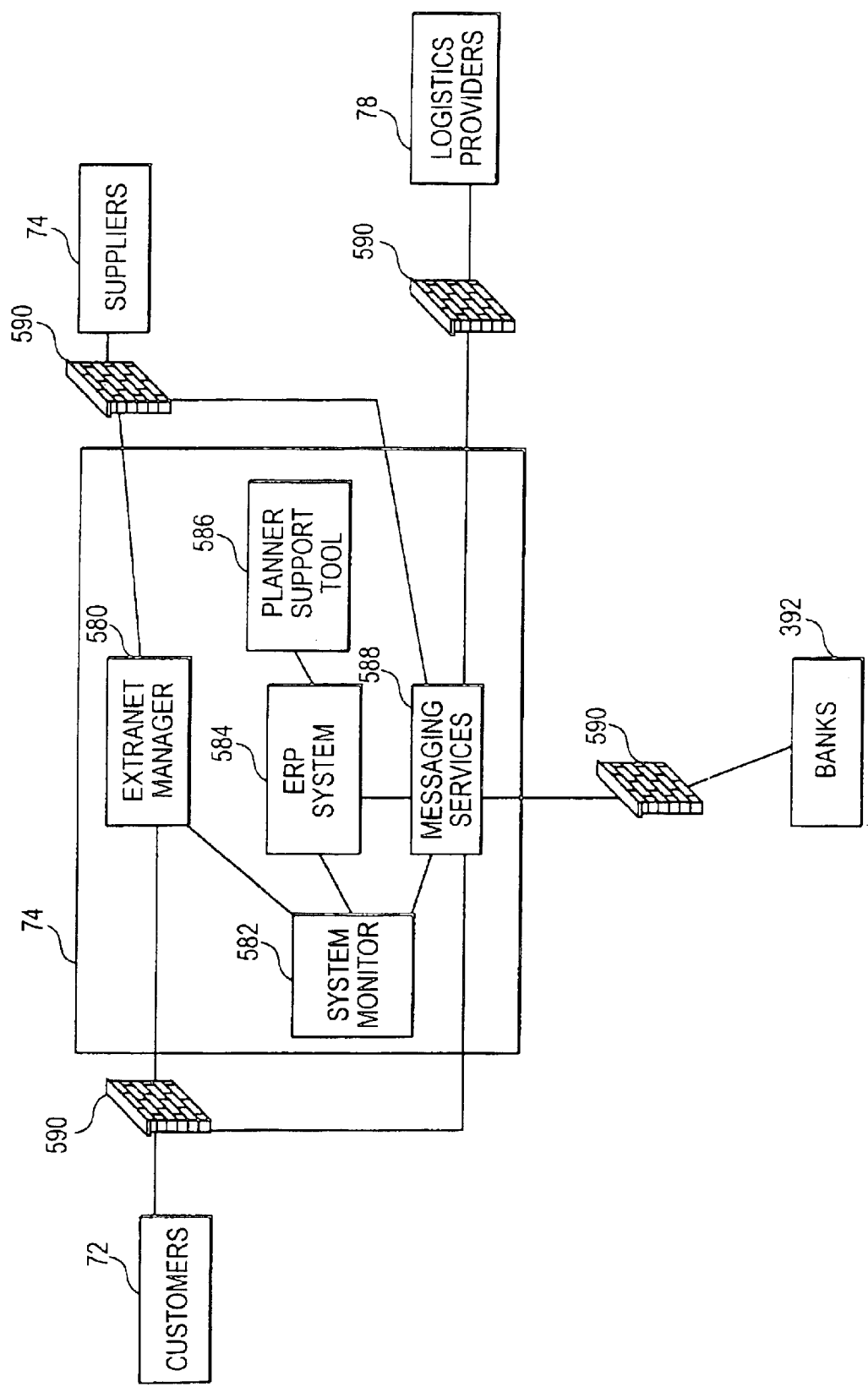
FIG. 24 is a more detailed diagram illustrating the supply chain server environment for the supply chain server shown in FIG. 23.

Referring to FIG. 24, there is shown a more detailed architecture of supply chain server 74. Supply chain server 74 includes an extranet manager 580, an ERP system 584, a planner support tool 586, and a messaging services section 588 all coupled to a system monitor 582. System monitor 582 monitors the operation of all the components of server 74 and facilitates the flow of information among these components. As shown in FIG. 24, customers 72 and suppliers 74 can communicate with extranet manager 580 through a firewall 590. Customers 72, suppliers 74, 3PLs 78 and banks 392 all communicate with messaging services section 588 of supply chain server 74 also through firewall 590.

Extranet manager 580 provides customers 72 and suppliers 74 with access to order and forecast information, access to any premium information services contracted with supply chain server 74, and access to Customer Master Data which is bibliographic information (e.g. name, address, account number, etc.) of customers. Extranet manager 580 performs this function by displaying web pages and generating new web pages with information received from ERP system 584 discussed below. Finally, Extranet manager 580 manages site membership and security and provides secure communication of data to and from server 74.

ERP (enterprise resources planning) system 584 provides server 74 with applications and systems support for financial, order management, demand management, procurement, and other enterprise processing capabilities. ERP system 584 allows for incorporation of data from suppliers 74, customers 72, logistics providers 78 and financial institutions 392 ("partners") and stores and manages the data from these partners in a standard format. ERP system 584 also provides employees of server 74 with real time access to enterprise information and provides workflow capabilities to ensure completion of business processes. Finally, ERP system 584 keeps track of the Customer Master Data.

Messaging services section 588 streamlines communications between supply chain server 74 and all of its partners. Messaging services section 588 translates all received information into a standardized format which is input into ERP system 584. Conversely, messaging services section 588 also receives information from ERP system 584 and generates outgoing messages in the format expected by a particular partner. Messaging services section 588 manages secure data transmission between server 74 and its partners, allows use of the Internet for all transmissions, and provides logging and serialization of all transmissions for audit purposes.

Planner support tool 586 allows Planners working for server 74 to manipulate forecast, demand and supply data. Planner support tool 586 aggregates data extracted from ERP system 584 thereby facilitating flexible, configurable analysis methods, providing a wide range of reporting capabilities, providing a definition of exception conditions in the analysis process, providing courses of action (workflow) should an exception occur, providing secure access to data, and allowing for multiple user access to this data while preserving the integrity of the data. By providing a Planner Support Tool that is external to Extranet 580, which works with ERP system 584, and which is coupled to messaging services station 588, a desirable supply-demand balance can be achieved.

X. Summary

Thus, by providing a supply chain server to handle many of the processes previously performed by individual entities of the prior art, a more efficient and cost minimizing architecture is realized. By consolidating purchases and supply chain management, supply chain server eliminates many of the steps and costs expended by customers and suppliers of prior art supply chains. Customers appreciate: lower prices, lower expenses for freight, buying, and planning systems, etc., faster and more reliable deliveries, shorter lead times and lower inventories, supply chain management savings, lower duties and taxes, product expertise, complete supply chain visibility, improved data integrity, improved profits, improved service to their customers, improved suppliers, and improved decision making. Suppliers benefit in: lower selling expenses, lower planning costs, lower inventories, improved delivery, lower product costs, visibility of demand, lower operating expenses, and reduced manufacturing costs from smoother production flows. This all leads to improved profitability while selling at lower prices which, in turn, will increase demand. Both customers and suppliers may have access to a secure web site hosted by supply chain server which will provide valuable information that was not available in the prior art. This information includes customer buying habits, and the size and growth rates of markets served. As the historical data detailing customer's buying patterns grows, it will become more expensive to switch to another supply chain network.

The costs of supply chain server will be borne by customers based upon the number of part numbers and the cumulative value of purchases. Suppliers need not be charged a fee so that the lowest possible price may be provided by suppliers. As the supply chain network is procuring products in bulk, it will receive a lower cost for the items and will realize this lower cost in profits.

Although demand and supply of products have been discussed, it should be clear that demand and supply of any resource, including services, is also within the scope of the invention. The term "product" throughout the specification thus refers to any such resource or service. For example, customers could be individuals desiring bandwidth on a trunk line in a network. Suppliers would then be sources of network bandwidth. Customers could also be, for example, individuals desiring airplane tickets or theater seats from corresponding suppliers.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A method for processing customer forecasted demands for direct material, the method comprising:

electronically receiving customer forecasted demands for procurement of direct material to be used for production of products in accordance with the customer forecasted demands by a supply chain server from at least one customer;

electronically analyzing by the supply chain server the customer forecasted demands to determine whether the customer forecasted demands are valid, wherein said step of analyzing includes determining whether the customer forecasted demands represent a known customer, whether the customer forecasted demands comply with contractual terms, whether the customer forecasted demands are complete, whether the customer forecasted demands are accurate, whether the customer forecasted demands adhere to previous forecasts, whether the customer forecasted demands adhere to previous buying patterns, and whether the customer forecasted demands represent requests within agreed to capacities, and wherein the step of analyzing further includes at least one of identifying major shifts relative to previous weeks' forecasts, identifying major cumulative shifts in buying patterns, identifying requests outside of agreed upon capacities, and identifying supply and demand requirements relative to at least one of a start-up, an end-of-run and a plant shutdown; and electronically sending by the supply chain server the customer forecasted demands to at least one supplier when the customer forecasted demands are determined to be valid.

2. The method as recited in claim 1, wherein the receiving the customer forecasted demands further includes extrapolating the customer forecasted demands based on expected demands by the at least one customer.

3. The method as recited in claim 2, wherein the extrapolating is based on historical data of the customer forecasted demands.

4. The method as recited in claim 2, wherein the extrapolating is based on information supplied by the customer.

5. The method as recited in claim 1, further comprising requiring the supplier to follow a production protocol in light of the sending.

6. The method as recited in claim 1, further comprising requiring the supplier to follow an inventory protocol in light of the sending.

7. The method as recited in claim 1, further comprising sending an exception notice to the customer when the customer forecasted demands are not valid.

8. The method as recited in claim 1, wherein, the customer forecasted demands are received by a supply chain server and wherein the analyzing includes checking at least one of: the credit of the customer, whether the customer forecasted demands comprise a complete forecast, whether all information is complete and accurate, whether the customer has a contract with the supply chain server, and whether a part number, associated with the customer forecasted demands is included in the contract between the supply chain server and the customer.

9. The method as recited in claim 1, wherein the customer forecasted demands relate to demands for a plurality of time periods from the at least one customer.

10. The method as recited in claim 1, further comprising:
accumulating the customer forecasted demands thereby producing an accumulated forecast; and sending the accumulated customer forecasted demands to the at least one supplier when the customer forecasted demands are valid.

11. The method as recited in claim 10, wherein the customer forecasted demands come from a plurality of customers.

12. The method as recited in claim 1, wherein the customer forecasted demands are in a format determined by the customer.

13. The method as recited in claim 12, further comprising converting the customer forecasted demands into a different format.

14. The method as recited in claim 12, wherein the customer forecasted demands are received in one of an email, a spreadsheet, and an XML format.

15. The method as recited in claim 1, wherein the customer forecasted demands relate to products.

16. The method as recited in claim 1, wherein the customer forecasted demands relate to services.

17. The method as recited in claim 1, wherein the customer forecasted demands relate to bandwidth in a network.

18. The method as recited in claim 1, wherein the customer forecasted demands relate to airline tickets.

19. The method as recited in claim 1, further comprising sending an abort code to the customer, the abort code enabling the customer to abort an order relating to one of the customer forecasted demands.

20. The method as recited in claim 19, further comprising canceling an order corresponding to one of the customer forecasted demands if the customer sends the abort code.

21. The method as recited in claim 1, further comprising sending products corresponding to the customer forecasted demands from the supplier to the customer.

22. The method as recited in claim 21, Further comprising providing tracking information relating to the products, to at least one of the customer and the supplier.

23. The method as recited in claim 22, wherein the tracking information is provided by producing a web site accessible by at least one of the customer and the supplier.

24. The method as recited in claim 22, wherein the tracking information includes information relaxing to potential bottlenecks between the supplier and the customer.

25. The method as recited in claim 24, wherein the bottlenecks include customs.

26. The method as recited in claim 1, further comprising
electronically receiving a return request by the at least one customer for a particular product;

electronically monitoring the returning of the particular product to a corresponding supplier; and determining whether the customer desires a replacement product; wherein the step of receiving is performed by said supply chain server in a supply chain network.

27. The method as recited in claim 26, further comprising determining whether the replacement product is available from at least one of the suppliers in the supply chain network.

28. The method as recited in claim 27, further comprising adjusting the customer forecasted demands when the replacement product is not available from the suppliers in the supply chain network.

29. The method of claim 1, wherein the direct material is used repeatedly for manufacture, comprises high-dollar values, is reported as at least one of raw materials and work-in-progress on quarterly balance sheets, and generates demand fluctuations each product cycle due to variations in demand and production bottlenecks.

30. A system for processing customer forecasted demands, the system composing:

a supply chain server coupled to at least one customer and at least one supplier, the supply chain server including a messaging services system and an ERP system; wherein:

the messaging services system electronically receives customer forecasted demands for procurement of direct material to be used for production of products in accordance with the customer forecasted demands from the at least one customer;

the ERP system electronically analyzes the customer forecasted demands received by the messaging services system to determine whether the customer forecasted demands are valid, by determining whether the customer forecasted demands represent a known customer, whether the customer forecasted demands comply with contractual terms, whether the customer forecasted demands are complete, whether the customer forecasted demands are accurate, whether the customer forecasted demands adhere to previous forecasts, whether the customer forecasted demands adhere to previous buying patterns, and whether the customer forecasted demands represent requests within agreed to capacities, and by at least one of identifying major shifts relative to previous weeks' forecasts, identifying major cumulative shifts in buying patterns, identifying requests outside of agreed upon capacities, and identifying supply and demand requirements relative to at least one of a start-up, an end-of-run and a plant shutdown; and the messaging system electronically sends the customer forecasted demands to the at least one supplier when the customer forecasted demands are determined to be valid.

31. The system as recited in claim 30, wherein the ERP system further extrapolates the customer forecasted demands based on expected demands by the customer.

32. The system as recited in claim 31, wherein the ERP system extrapolates the customer forecasted demands based on historical data of the forecasted demands.

33. The system as recited in claim 31, wherein the ERP system extrapolates the customer forecasted demands based on information supplied by the customer.

34. The system as recited in claim 30, further comprising a contractual agreement requiring the supplier to follow a production protocol in light of the customer forecasted demands sent by the messaging services system.

35. The system as recited in claim 30, further comprising a contractual agreement requiring the supplier to follow an inventory protocol in light of the customer forecasted demands sent by the messaging services system.

36. The system as recited in claim 30, wherein the messaging services system sends an exception notice to the customer when the ERP system determines that the customer forecasted demands are not valid.

37. The system as recited in claim 30, wherein the ERP system analyzes the customer forecasted demands by checking at least one of: the credit of the customer, whether the customer forecasted demands comprise a complete forecast, whether all information is complete and accurate, whether the customer has a contract with the supply chain server; and whether a part number associated with the customer forecasted demands are included in the contract between the supply chain server and the customer.

38. The system as recited in claim 30, wherein the customer forecasted demands relate to demands for a plurality of time periods from the at least one customer.

39. The system as recited in claim 30, wherein:

the ERP system further accumulates the customer forecasted demands thereby producing an accumulated forecast; and the messaging services system sends the accumulated customer forecasted demands to at least one of the suppliers when the customer forecasted demands are valid.

40. The system as recited in claim 39, wherein the accumulated customer forecasted demands come from a plurality of customers.

41. The system as recited in claim 30, wherein the customer forecasted demands are in a format determined by the customer.

42. The system as recited in claim 41, wherein the messaging services system further converts the customer forecasted demands into a different format.

43. The system as recited in claim 41, wherein the customer forecasted demands are received in one of an EDI, an email, a spreadsheet, and an XML format.

44. The system as recited in claim 30, wherein the customer forecasted demands relate to products.

45. The system as recited in claim 30, wherein the customer forecasted demands relate to services.

46. The system as recited in claim 30, wherein the customer forecasted demands relate to bandwidth in a network.

47. The system as recited in claim 30, wherein the customer forecasted demands relate to airline tickets.

48. The system as recited in claim 30, wherein the messaging system further sends an abort code to the customer, the abort code enabling the customer to abort an order relating to one of the customer forecasted demands.

49. The system as recited in claim 48, wherein the ERP system further cancels an order corresponding to one of the customer forecasted demands upon receiving an abort code from the customer.

50. The system as recited in claim 30, wherein:

the supply chain server is Further connected to at least one logistics provider; and the ERP system further sends a command to the logistics provider so that the logistics provider transfers products corresponding to the customer forecasted demands from the supplier to the customer in response to orders from the supply chain server.

51. The system as recited in claim 50, wherein the supply chain server further comprises an extranet manager, the extranet manager providing tracking information relaxing to the products.

52. The system as claimed in claim 51, wherein the extranet manager provides the tracking information by producing a web site accessible by at least one of the customer and the supplier.

53. The system as recited in claim 51, wherein the tracking information includes information regarding the status of the product through potential bottlenecks between the supplier and the customer.

54. The system as recited in claim 53, wherein the bottlenecks include customs.

55. The system as recited in claim 30, wherein:

the supply chain server is further coupled logistics provider;

the messaging services system receives a return request by the at least one customer for a particular product;

the ERP system controls the logistics provider to return the particular product to a corresponding supplier; and the ERP system determines whether the customer desires a replacement product.

56. The system as recited in claim 55, wherein the ERP system further determines whether the replacement product is available from suppliers in the system.

57. The system as recited in claim 56, wherein the ERP system further adjusts the customer forecasted demands when the replacement product is not available from suppliers in the system.

58. The system of claim 30, wherein the direct material is used repeatedly for manufacture, comprises high-dollar values, is reported as at least one of raw materials and work-in-progress on quarterly balance sheets, and generates demand fluctuations each product cycle due to variations in demand and production bottlenecks.

59. A method for processing customer forecasted demands for direct material, the method comprising:

electronically receiving customer forecasted demands for procurement of direct material to be used for production of products in accordance with the customer forecasted demands by a supply chain server from at least one customer;

electronically converting the customer forecasted demands from a first data format to a second data format;

electronically analyzing by the supply chain server the converted customer forecasted demands to determine whether the converted customer forecasted demands are valid, wherein the step of analyzing includes determining of whether the converted customer forecasted demands represent a known customer, whether the converted customer forecasted demands comply with contractual terms, whether the converted customer forecasted demands are complete, whether the converted customer forecasted demands are accurate, whether the converted customer forecasted demands adhere to previous forecasts, whether the converted customer forecasted demands adhere to previous buying patterns, and whether the converted customer forecasted demands represent requests within agreed-to capacities, and wherein the step of analyzing further includes at least one of identifying major shifts relative to previous weeks' forecasts, identifying major cumulative shifts in buying patterns, identifying requests outside of agreed upon capacities, and identifying supply and demand requirements relative to at least one of a start-up, an end-of-run and a plant shutdown;

electronically determining whether each respective customer represented in each customer's respective converted forecasted demand has an approved credit standing after each customer's respective converted forecasted demands are determined to be valid;

electronically transmitting an error notification to any customer associated with a converted forecasted demand determined not to be valid or any customer determined riot to have an approved credit standing; and electronically sending by the supply chain server the valid converted customer forecasted demands to at least one supplier for each customer determined to have an approved credit standing.

60. The method of claim 59, wherein the direct material is used repeatedly for manufacture, comprise high-dollar values, are reported as at least one of raw materials and work-in-progress on quarterly balance sheets, and generate demand fluctuations each product cycle due to variations in demand and production bottlenecks.

* * * * *